US012572752B2

(12) United States Patent
Liu

(10) Patent No.: US 12,572,752 B2
(45) Date of Patent: Mar. 10, 2026

(54) DYNAMIC CONTENT GENERATION METHOD

(71) Applicant: Jim Liu, Las Vegas, NV (US)

(72) Inventor: Jim Liu, Las Vegas, NV (US)

( * ) Notice: Subject to any disclaimer, the term of this patent is extended or adjusted under 35 U.S.C. 154(b) by 293 days.

(21) Appl. No.: 18/314,249

(22) Filed: May 9, 2023

(65) Prior Publication Data

US 2024/0378397 A1    Nov. 14, 2024

(51) Int. Cl.
| | |
|---|---|
| *G06F 40/40* | (2020.01) |
| *G06F 3/0486* | (2013.01) |
| *G06F 40/106* | (2020.01) |
| *G06F 40/174* | (2020.01) |
| *G06F 40/30* | (2020.01) |
| *G06T 11/20* | (2026.01) |

(52) U.S. Cl.
CPC ............ *G06F 40/40* (2020.01); *G06F 3/0486* (2013.01); *G06F 40/106* (2020.01); *G06F 40/174* (2020.01); *G06F 40/30* (2020.01); *G06T 11/206* (2013.01)

(58) Field of Classification Search
CPC ........ G06F 40/40; G06F 40/106; G06F 40/30; G06F 40/174; G06F 3/0486; G06T 11/206
See application file for complete search history.

(56) References Cited

U.S. PATENT DOCUMENTS

| | | | | | |
|---|---|---|---|---|---|
| 11,636,257 | B2 * | 4/2023 | Peleg | ................... | G06F 40/166 |
| | | | | | 715/256 |
| 11,868,313 | B1 * | 1/2024 | Ryan | ................... | G06V 10/764 |
| 11,983,553 | B2 * | 5/2024 | Bent, III | ................. | G06F 9/453 |
| 12,008,058 | B2 * | 6/2024 | Voisin | ................... | G06F 18/214 |
| 12,073,180 | B2 * | 8/2024 | Tunstall-Pedoe | ..... | G06F 40/279 |
| 12,277,870 | B2 * | 4/2025 | Khan | ....................... | G06F 40/30 |
| 2022/0237368 | A1 * | 7/2022 | Tran | ....................... | G06N 20/00 |
| 2024/0273291 | A1 * | 8/2024 | Smith | ................... | G06F 16/383 |

(Continued)

OTHER PUBLICATIONS

Wang, Shuyue, and Pan Jin, "A Brief Summary of Prompting in Using GPT Models", Apr. 2023, Qeios, pp. 1-14. (Year: 2023).*

(Continued)

*Primary Examiner* — Daniel C Washburn
*Assistant Examiner* — James Boggs
(74) *Attorney, Agent, or Firm* — Rosenberg, Klein & Lee

(57) ABSTRACT

A computer-implemented dynamic content generation method is executed by a processing module electrically connected to an input module and a communications module. The computer-implemented dynamic content generation method includes the following steps: generating a topic, at least one variable, and a selected writing type according to a setting command received from the input module; communicating with a natural language processing (NLP) model for receiving relevance data of the at least one variable to the topic; communicating with the NLP model for receiving a content text produced by the NLP model according to the topic, the at least one variable, the selected writing type, and the relevance data; when the content text satisfies the selected writing type, stopping receiving the content text, or else generating a correction information, applying the correction information to the relevance data, and iteratively re-generating the content text until the content text satisfies the selected writing type.

19 Claims, 15 Drawing Sheets

(56)        References Cited

U.S. PATENT DOCUMENTS

2024/0362404 A1* 10/2024 Raees ................... G06F 40/166
2024/0362427 A1* 10/2024 Gupta ..................... G06F 40/56

OTHER PUBLICATIONS

Salemi, Alireza, Sheshera Mysore, Michael Bendersky, and Hamed Zamani, "LaMP: When Large Language Models Meet Personalization", Apr. 2023, arXiv preprint arXiv:2304.11406. (Year: 2023).*
Ekin, Sabit, "Prompt Engineering For ChatGPT: A Quick Guide To Techniques, Tips, And Best Practices", Apr. 2023, TechRxiv. (Year: 2023).*
Hariri, Walid, "Unlocking the Potential of ChatGPT: A Comprehensive Exploration of its Applications, Advantages, Limitations, and Future Directions in Natural Language Processing", Apr. 2023, arXiv preprint arXiv:2304.02017. (Year: 2023).*
Tang, Tianyi, Junyi Li, Wayne Xin Zhao, and Ji-Rong Wen, "Context-Tuning: Learning Contextualized Prompts for Natural Language Generation", Oct. 2022, Proceedings of the 29th International Conference on Computational Linguistics, pp. 6340-6354. (Year: 2022).*
Gero, Katy Ilonka, Vivian Liu, and Lydia B. Chilton, "Sparks: Inspiration for Science Writing using Language Models", Jun. 2022, Proceedings of the 2022 ACM Designing Interactive Systems Conference, pp. 1002-1019. (Year: 2022).*
Garbacea, Cristina, and Qiaozhu Mei, "Why is constrained neural language generation particularly challenging?", Jun. 2022, arXiv preprint arXiv:2206.05395, pp. 1-22. (Year: 2022).*
Ning, Xinyi, "Topic-to-Text Generation with PMI-IR Additional Semantic Information", Dec. 2021, 2021 International Conference on Asian Language Processing (IALP), pp. 131-136. (Year: 2021).*

* cited by examiner

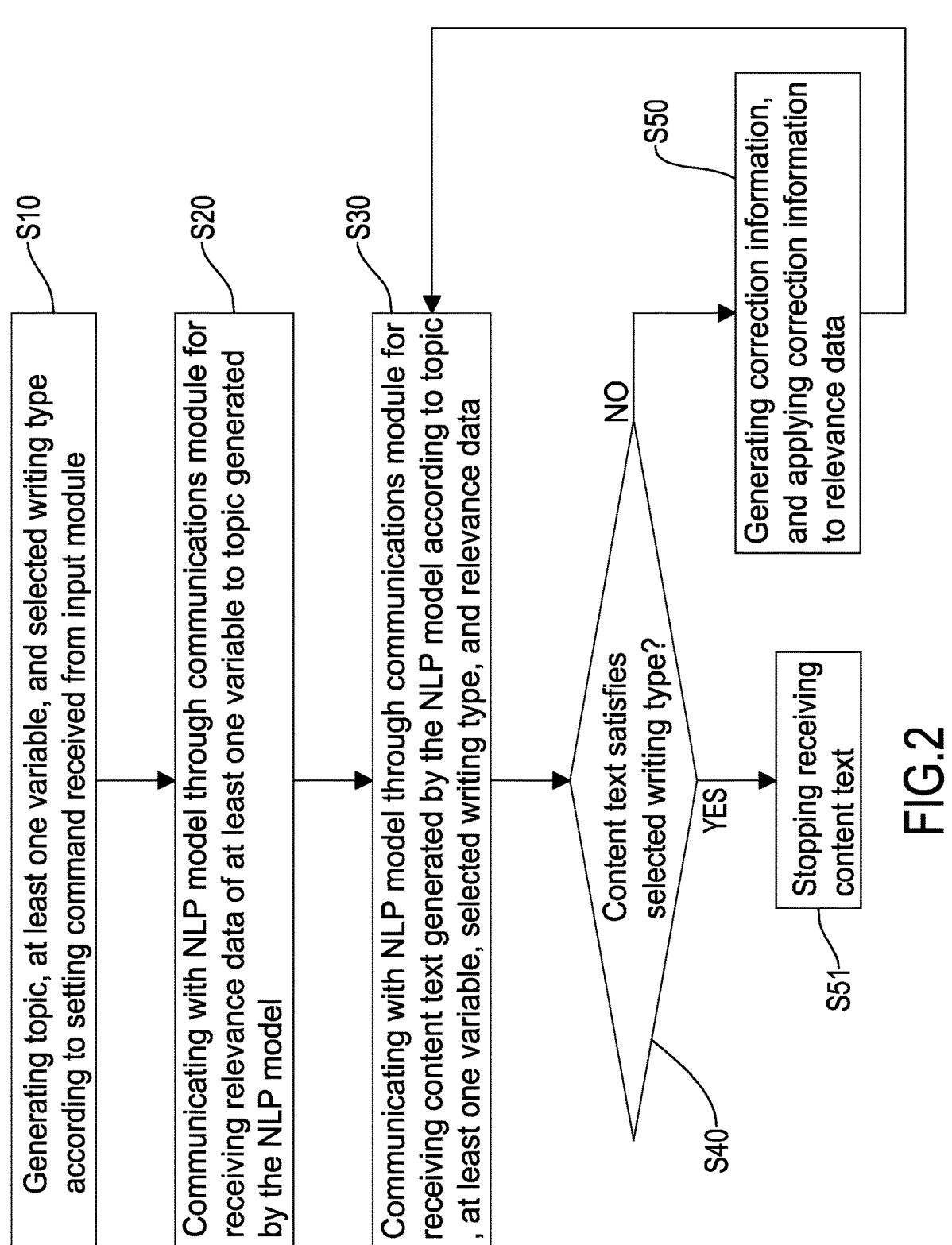

S10

Generating topic, at least one variable, and selected writing type according to setting command received from input module

S20

Communicating with NLP model through communications module for receiving relevance data of at least one variable to topic generated by the NLP model

S30

Communicating with NLP model through communications module for receiving content text generated by the NLP model according to topic, at least one variable, selected writing type, and relevance data

S40

Content text satisfies selected writing type?

NO

S50

Generating correction information, and applying correction information to relevance data

YES

S51

Stopping receiving content text

FIG.2

DYNAMIC CONTENT GENERATION METHOD

BACKGROUND OF THE INVENTION

1. Field of the Invention

The present invention relates to a content generation method, more particularly a computer-implemented dynamic content generation method.

2. Description of the Related Art

In recent years, developments in artificial intelligences (AIs) have accelerated machines' understandings of natural languages. With the emergence of powerful natural language processing (NLP) models, such as Generative Pre-Trained Transformers (GPT) released by OpenAIR®, various types of contents, such as online articles, blogs, and marketing materials, became increasingly integrated with content generation of NLP models.

However, despite having powerful NLP models such as GPT-4 available to the public, user-provided input variables may not always be suitable or relevant to the topic of the content. For example, if a user wishes to write an online article to promote sales of wireless earphones, the user might mistakenly use "best portable earphones on sale" to describe the wireless earphones. While wireless earphones are most likely portable, portable earphones are not necessarily wireless, and hence the user-provided input is not entirely suitable to the topic of promoting the wireless earphones. Currently existing NLP models however May not account for such a mismatch between the user-provided input variables and the topic, and hence the content generated by the AI may not be as coherent or natural as desired.

Furthermore, currently existing NLP models also may have a limited understanding of logics between different words. For example, if a user wishes to write an article about someone's funeral, the content generated by the currently existing NLP models may be an obituary. The obituary is an article in memory of someone, and someone's demise is connected to a funeral, but the user originally intended to write about somebody's passing away without disrespecting the deceased by writing the obituary. In other words, currently existing NLP models may not fully understand the logics and contexts to generate relevant contents in relations to the user-provided topic. Due to this limitation, quality of contents generated by the currently existing NLP models in its first attempt usually does not satisfy the user. The unsatisfied user, with great burden, often needs to continuously prompt the currently existing NLP models for improving content quality. However, this process is time consuming, and the user may not understand how to correctly prompt the currently existing NLP models to generate more coherent contents.

SUMMARY OF THE INVENTION

The present invention provides a computer-implemented dynamic content generation method. The computer-implemented dynamic content generation method is able to determine relevance between a topic and at least one variable before utilizing a natural language processing (NLP) model to generate highly relevant contents. The content generated by the computer-implemented dynamic content generation method is more coherent and natural than a content solely generated by the NLP model.

In an embodiment, the computer-implemented dynamic content generation method of the present invention is executed by a processing module, and the processing module is electrically connected to an input module and a communications module. The computer-implemented dynamic content generation method includes the following steps:

step A: generating a topic, at least one variable, and a selected writing type according to a setting command received from the input module;

step B: communicating with a natural language processing (NLP) model through the communications module for receiving relevance data of the at least one variable to the topic generated by the NLP model;

step C: communicating with the NLP model through the communications module for receiving a content text generated by the NLP model according to the topic, the at least one variable, the selected writing type, and the relevance data;

step D: determining whether the content text satisfies the selected writing type;

step E: when the content text satisfies the selected writing type, stopping receiving the content text; and step F: when the content text fails to satisfy the selected writing type, generating a correction information, applying the correction information to the relevance data, and executing step C.

The present invention essentially creates a higher-order content generation model built upon the NLP model for determining relevance between the topic and the at least one variable. The higher-order content generation model includes a quality check before finalizing the generation of the content text. If the generated content text fails to satisfy the selected writing type, the present invention will interactively and automatically prompt the NLP model for generating the content text, and thus the content text would be iteratively generated with adjusted settings until the content text finally satisfies the selected writing type. As such, the resulting content text not only satisfies the selected writing type, but flows coherently and naturally, fitting the given context of the topic. Furthermore, the content text generated by the present invention also more closely resembles a human-written text than an AI-generated text according to any currently existing third party article analyzing tool. As such, the content text generated by the present invention is able to score higher marks, showing higher likelihood of being a human-written text than a text solely generated by the NLP model.

In another embodiment, the computer-implemented dynamic content generation method of the present invention is executed by a processing module that is in electrical connection with an input module, a memory module, and a communications module, and the communications module is in electrical communication with a natural language processing (NLP) model. In this embodiment, the computer-implemented dynamic content generation method comprises the following steps:

automatically rating at least one variable in terms of how related the at least one variable is to a topic according to relevance data through automatically communicating with the NLP model;

wherein the at least one variable and the topic are previously received by the processing module from the input module; wherein the relevance data is previously received by the processing module through the communications module from the NLP model as the processing module communicates to the NLP model through the communications module.

By automatically rating the at least one variable in terms of how related the at least one variable is to the topic, a relevance between the topic and the at least one variable is thoroughly investigated by the computer-implemented dynamic content generation method. This investigation before utilizing the NLP model to generate highly relevant contents, provides a crucial information that allows the NLP model to subsequently generate highly relevant contents. This investigation also provides valuable and analytical insights for a user of the present invention to understand how related the at least one variable is to the topic.

BRIEF DESCRIPTION OF THE DRAWINGS

FIG. 2 is a flow chart of the computer-implemented dynamic content generation method of the present invention.

DETAILED DESCRIPTION OF THE INVENTION

The present invention provides a computer-implemented dynamic content generation method. The computer-implemented dynamic content generation method is a software that generates a coherent and natural text as a content. The generated content can then be used online or offline as desired by a user of the present invention.

Figure 1:
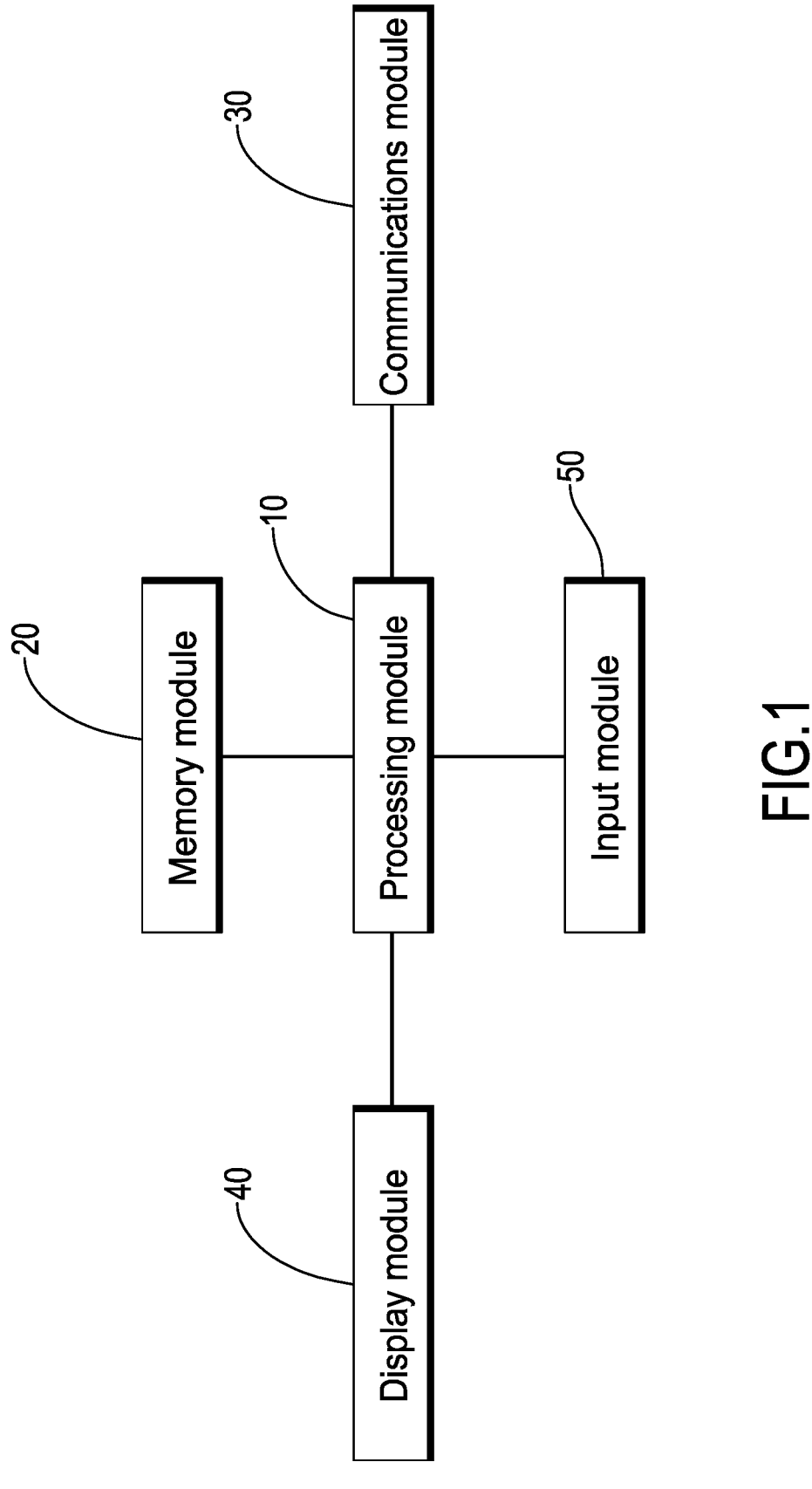
FIG. 1 is a block diagram of a hardware system for executing a computer-implemented dynamic content generation method of the present invention.

With reference to FIG. 1, a hardware system for executing the computer-implemented dynamic content generation method of the present invention includes a processing module 10, a memory module 20, a communications module 30, a display module 40, and an input module 50. The processing module 10 is respectively electrically connected to the memory module 20, the communications module 30, the display module 40, and the input module 50.

The processing module 10 is configured to execute the computer-implemented dynamic content generation method of the present invention. The memory module 20 stores multiple writing models available for selection by the user of the present invention. The communications module 30 is connected to the Internet for accessing an NLP model. In an embodiment of the present invention, the NLP model accessed by the present invention is a type of large language model (LLM), such as a Generative Pre-Trained Transformer (GPT) developed by OpenAI®, and more specifically, a GPT-3.5 model or GPT-4 model developed by OpenAI®. In another embodiment, the NLP model accessed by the present invention can be elsewise, such as being another type of LLM.

In an embodiment, the hardware system for executing the computer-implemented dynamic content generation method of the present invention is a computer. The display module 40 and the input module 50 are respectively a screen and a combination of a mouse and a keyboard available for user interaction with the processing module 10. In another embodiment, the hardware system for executing the computer-implemented dynamic content generation method of the present invention is a portable smart device, such as a smart phone or a tablet computer. The display module 40 and the input module 50 are a touch screen available for user interaction with the processing module 10.

With reference to FIG. 2, the computer-implemented dynamic content generation method of the present invention is executed by the processing module 10 and includes the following steps:

Step S10: generating a topic, at least one variable, and a selected writing type according to a setting command received from the input module 50;

Step S20: communicating with the NLP model through the communications module 30 for receiving relevance data of the at least one variable to the topic generated by the NLP model;

Step S30: communicating with the NLP model through the communications module 30 for receiving a content text generated by the NLP model according to the topic, the at least one variable, the selected writing type, and the relevance data;

Step S40: determining whether the content text satisfies the selected writing type;

Step S50: when the content text fails to satisfy the selected writing type, generating a correction information, applying the correction information to the relevance data, and executing step S30;

Step S51: when the content text satisfies the selected writing type, stopping receiving the content text.

The input module 50 interacts with the user and generates the setting command according to the user interaction. The input module 50 generates and sends the setting command to the processing module 10 as receiving inputs from the user.

The present invention creates a higher-order content generation model built upon the NLP model, such as GPT-4, for determining relevance between the topic and the at least one variable. The higher-order content generation model includes a quality check before finalizing the generation of the content text. If the generated content text fails to satisfy the selected writing type, the content text would be iteratively generated with adjusted settings until the content text finally satisfies the selected writing type. As such, the resulting content text not only satisfies the selected writing type, but flows coherently and naturally, fitting the given context of the topic, while using the NLP model alone may not consistently accomplish this.

Furthermore, the content text generated by the present invention also more closely resembles a human-written text than an AI-generated text. This effect can be objectively observed by using a third party article analyzing tool or website to determine a score, wherein the higher the score, the more likely that the text is human-written, and the lower the score, the more likely that the text is machine-generated or AI-generated. According to any currently existing third party article analyzing tools or websites, the content text generated by the present invention is always scored as having a high likelihood of being human-written. More particularly, by using a third party article analyzing website such as AI Text Classifier, the content text generated by the present invention consistently scores above 95% human-like. This benchmark is hardly ever attainable by solely using the NLP model, such as GPT-4, for generating a content text regarding the topic, the at least one variable, and the selected writing type. In other words, the context text generated by the present invention is able to score higher marks as having higher likelihood of being human-written than a paragraph solely generated by the NLP model.

Furthermore, the present invention differs from the NLP model as the NLP model lacks a functionality to automatically evaluate a quality of the generated content text and iteratively re-generate the content text until the quality is ensured. By having a loop structure from step S30 to step S50, the present invention ensures the generated content, in other words, the generated content text, is consistently coherent and natural, and thus of high writing quality.

Before each iteration of executing step S30, the processing module 10 of the present invention receives relevance data of the at least one variable to the topic, and then communicates to the NLP model for prompting the NLP model to generate the content text according to the topic, the at least one variable, the selected writing type, and the relevance data. This process is an adaptive process, as the processing module 10 automatically changes its prompting approach towards the NLP model for generating the content text according to the topic, the at least one variable, the selected writing type, and the relevance data. More particularly, once the processing module 10 receives the setting command from the input module 50, the topic, the at least one variable, and the selected writing type are all settled and remain unchanged throughout iterations of generating the content text. However, with each iteration of generating the content text, the relevance data is iteratively updated by the correction information, and thus the relevance data is dynamically changing with each iteration. As such, the process of generating the content text is the adaptive process most dependent on the dynamic changes of the relevance data.

The present invention adapts to provide different instructions to the NLP model for generating the content text depending on the changes of the relevance data. The adaptation of different instructions provided to the NLP model by the present invention is dynamically decided by the processing module 10 based on the relevance of the at least one variable to the topic and the selected writing type. These different instructions are the correction information that is generated by the processing module 10 and applied to the relevance data for updating the relevance data. As the relevance data is updated, successive generation of the content text by the NLP model would be most likely improved and come a step closer to satisfy the selected writing type.

Figure 3:
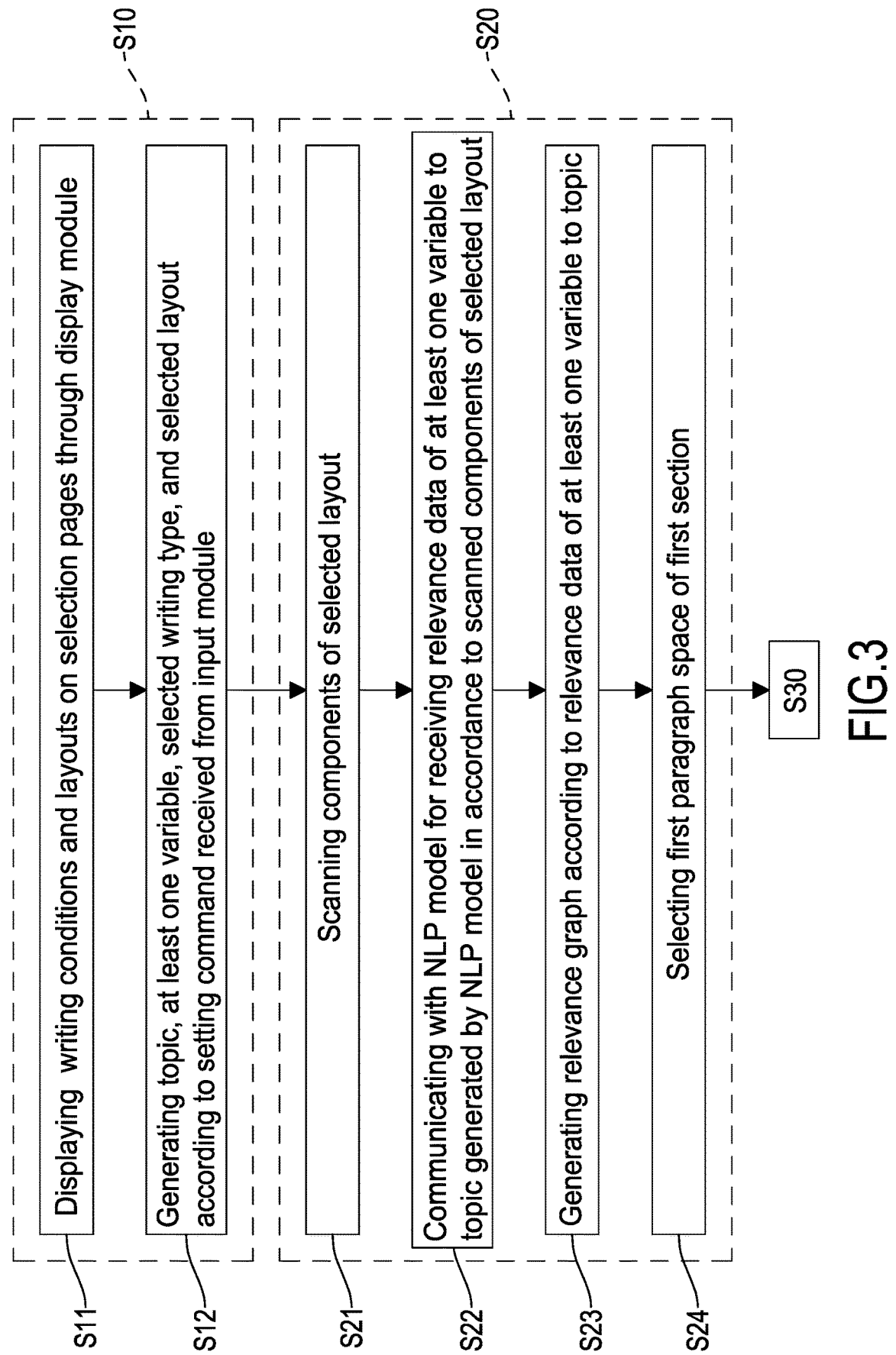
FIG. 3 is another flow chart of the computer-implemented dynamic content generation method of the present invention.

With reference to FIG. 3, in an embodiment of the present invention, step S10 further includes the following sub-steps:

Step S11: displaying multiple writing conditions and multiple layouts on multiple selection pages through the display module 40; and Step S12: generating the topic, the at least one variable, the selected writing type, and a selected layout according to the setting command received from the input module 50.

In this embodiment, the selected layout is a web page, and the scanned components of the selected layout comprise at least one paragraph space in at least one section of the web page. More particularly, the web page for the selected layout is a landing page for a website. In other embodiments, the selected layout is free to be elsewise.

The at least one variable is an input Universal Resource Locator (URL) reference, a keyword, a note or instruction, a brand, a sub-topic, a recommended keyword, or a search engine optimization. In other embodiments, the at least one variable is free to be elsewise. The input module 50 allows the user of the present invention to interact and to select the at least one variable used for the present invention. According to the user selection, the input module 50 generates input signals to the processing module 10 for specifying types of the at least one variables used for the present invention.

Furthermore, step S20 further includes the following sub-steps:

Step S21: scanning components of the selected layout for accessing the selected layout;

Step S22: communicating with the NLP model through the communications module 30 for receiving the relevance data of the at least one variable to the topic generated by the NLP model in accordance with the scanned components of the selected layout;

Step S23: generating a relevance graph according to the relevance data of the at least one variable to the topic; and Step S24: selecting a first paragraph space of a first section amongst the at least one paragraph space in the at least one section of the web page. The at least one paragraph space is a blank available to be filled in with the content text generated by the present invention in the at least one section of the web page. Once a paragraph space is selected through step S24, the present invention will then proceed to execute step S30 for generating the content text for the paragraph space.

In this embodiment, the present invention further includes a step of rating the at least one variable in terms of how related the at least one variable is to the topic according to the relevance data. More particularly, the at least one variable is rated according to the relevance data as shown below:

TABLE 1

| Rating | Meaning | Rule on Keywords | Rule on Client URL | Rule on Branding | Rule on Guidelines |
|--------|---------|------------------|--------------------|------------------|--------------------|
| 0, 1 | NOT RELATED | Do not mention keywords | Do not consider URL | Do not include the brand | Do not follow the guidelines |
| 2 | BARELY RELATED | Do not mention keywords | Do not consider URL | Do not include the brand | Do not follow the guidelines |
| 3 | SOMEWHAT RELATED | Consider Keywords | Consider the URL | Possibly consider the brand | Consider only the relevant info in the guidelines |

TABLE 1-continued

| Rating | Meaning | Rule on Keywords | Rule on Client URL | Rule on Branding | Rule on Guidelines |
|--------|---------|------------------|--------------------|------------------|--------------------|
| 4 | RELATED | Mention Keywords | Mention info from the URL | Mention the brand | Consider all the information in the guidelines |
| 5 | VERY RELATED | Focus on Keywords | Cite or talk about content in the URL | Mention the brand | Follow all instructions in the guidelines |

In other words, according to Table 1, the relevance data is rated "1", being not related (hence not relevant) to the topic at all, while the rating "5" is very related (hence very relevant) to the topic. In an embodiment associated with Table 1, the at least one variable used includes the input URL reference (associated as client URL in Table 1), the keyword (associated as keywords in Table 1), the note or instruction (associated as guidelines in Table 1), and the brand (associated as branding in Table 1). By executing step S22, the processing module 10 of the present invention communicates with the NLP model, such as GPT, to produce the relevance data for respectively investigating relevance of the topic to the input URL reference, the keyword, the note or instruction, and the brand. Each of the variables, depending on their ratings, would affect how the content text is worded by the NLP model in step S30.

Furthermore, in this embodiment, the memory module 20 stores various relevance thresholds used for determining relevancy between each of the variables to the topic. In this example, the various relevance thresholds include a relevance threshold for the input URL reference, a relevance threshold for the keyword, a relevance threshold for the note, and a relevance threshold for the brand. The relevance thresholds for the input URL reference, the keyword, the note, and the brand are respectively set to a relevance rating of three. The determination of whether the content text satisfies the selected writing type mentioned in step S40 respectively uses the said relevance thresholds to determine whether each of the variables is relevant to be included in the content text.

Figure 4:
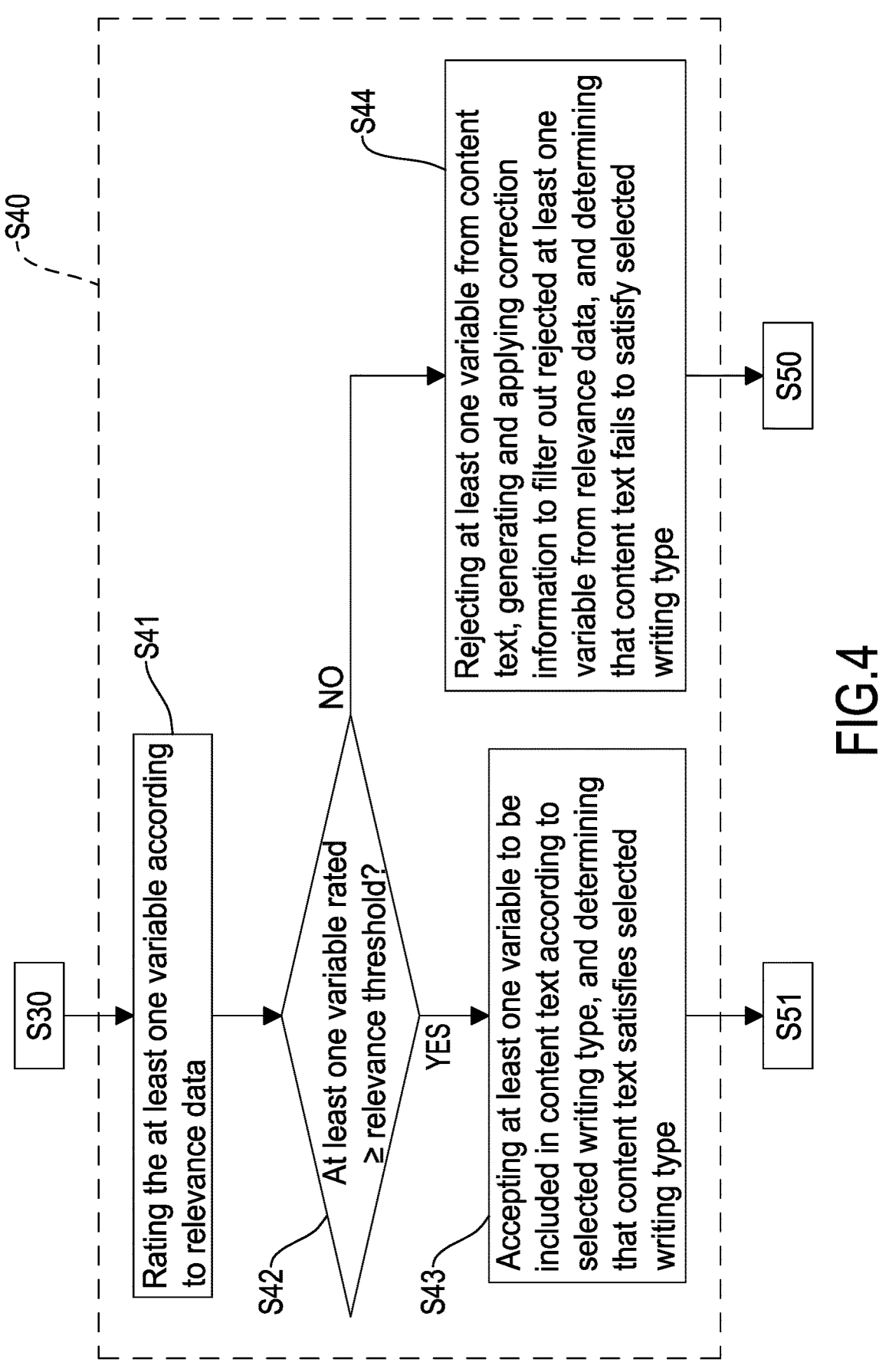
FIG. 4 is another flow chart of the computer-implemented dynamic content generation method of the present invention.

With reference to FIG. 4, step S40 includes the following sub-steps:

Step S41: rating the at least one variable in terms of how related the at least one variable is to the topic according to the relevance data;

Step S42: determining whether the at least one variable is rated greater than a relevance threshold;

Step S43: when the at least one variable is rated greater than or equal to the relevance threshold, accepting the at least one variable to be included in the content text according to the selected writing type, determining that the content text satisfies the selected writing type, and executing step S51; and Step S44: when the at least one variable is rated less than the relevance threshold, rejecting the at least one variable from the content text according to the selected writing type, generating and applying the correction information to filter out the rejected at least one variable from the relevance data, determining that the content text fails to satisfy the selected writing type, and executing step S50.

In other words, if the input URL reference, the keyword, the note, and the brand are respectively rated greater than three, the input URL reference, the keyword, the note, and the brand are respectively included in the content text when the content text is iteratively generated. If the input URL reference, the keyword, the note, and the brand are respectively rated less than the relevance threshold (three), the input URL reference, the keyword, the note, and the brand are respectively rejected from the content text when the content text is iteratively generated according to the selected writing type, and thus the correction information is iteratively generated and applied to filter out the rejected at least one variable from the relevance data. If the input URL reference, the keyword, the note, and the brand are respectively rated equal to the relevance threshold (three), the input URL reference, the keyword, the note, and the brand are respectively possibly included in the content text when the content text is iteratively generated. The aforementioned rules on the input URL reference, the keyword, the note, and the brand are also shown in Table 1 for reference.

Figure 5A:
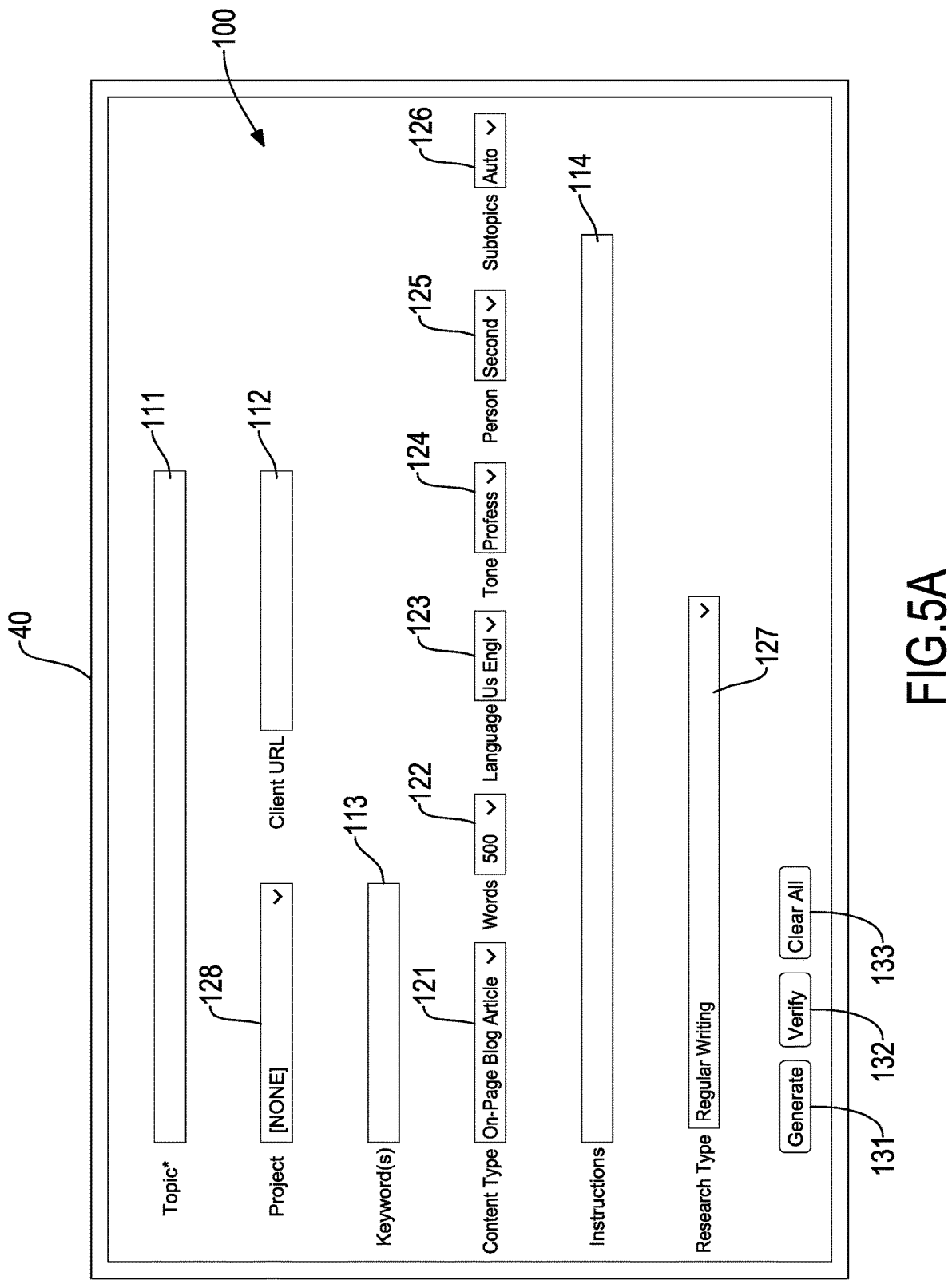
FIG. 5A is a perspective view of a selection page shown on a display module for the computer-implemented dynamic content generation method of the present invention.
Figure 5B:
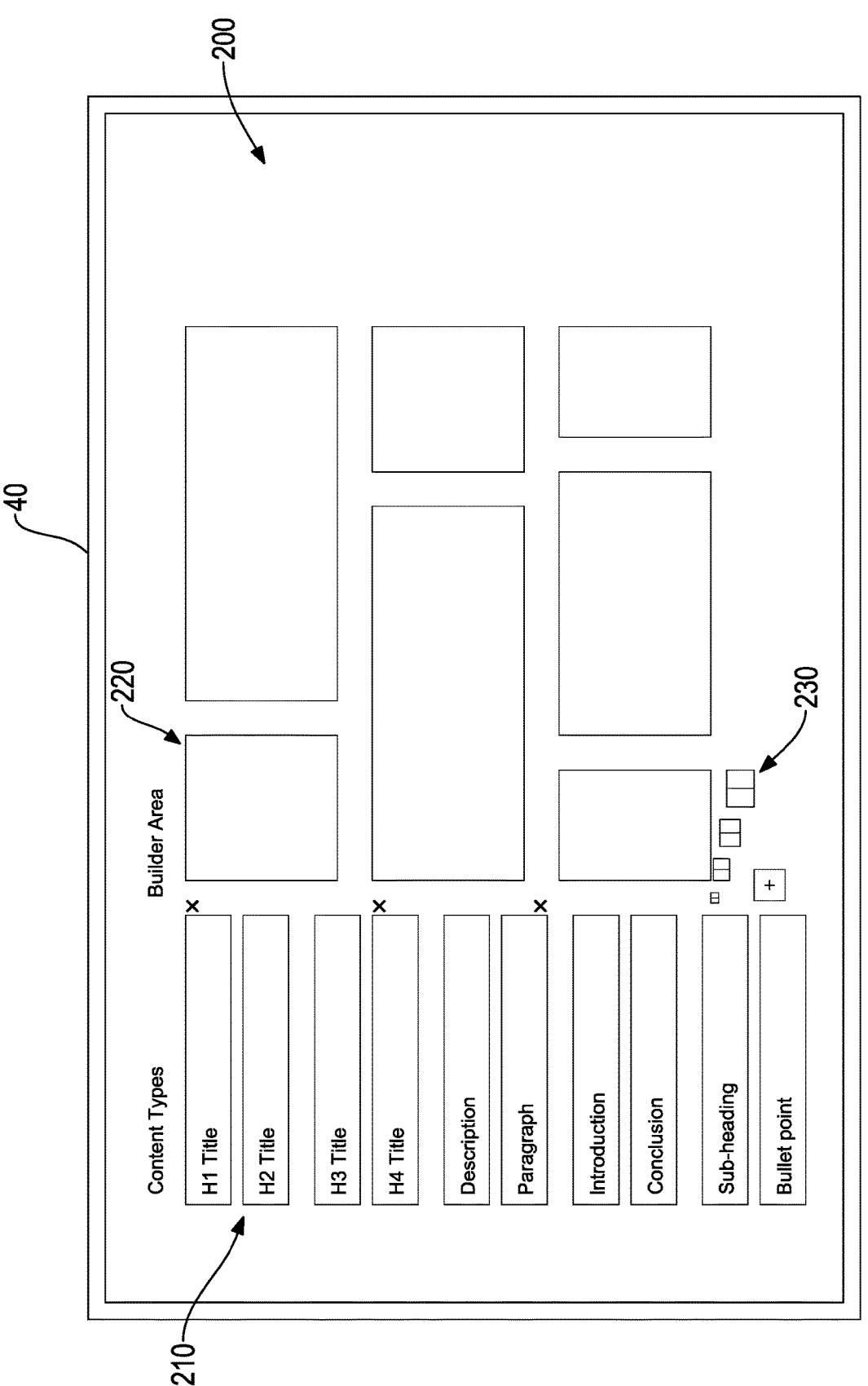
FIGS. 5B to 5D are perspective views of other selection pages shown on the display module for the computer-implemented dynamic content generation method of the present invention.

With reference to FIGS. 5A and 5B, a first selection page 100 and a second selection page 200 are respectively displayed by the display module 40 for the user of the present invention.

In FIG. 5A, the first selection page 100 displays multiple boxes for the user to fill in the topic as well as the variables used for subsequently generating the content text. The boxes displayed on the first selection page 100 include a topic box 111, a client URL box 112, a keyword box 113, and an instruction box 114. Furthermore, the first selection page 100 also displays multiple dropdown menus for the user to select as well as multiple action buttons. The dropdown menus include a content type dropdown menu 121, a word count dropdown menu 122, a language dropdown menu 123, a tone dropdown menu 124, a perspective dropdown menu 125, a sub-topic dropdown menu 126, a research type dropdown menu 127, and a project selection dropdown menu 128. The action buttons include a generate button 131, a verify button 132, and a clear all button 133.

After the user selects through the dropdown menus and fills in the boxes via the input module 50, the user may press the generate button 131 through the input module 50. This allows the input module 50 to correspondingly produce the setting command according to the selected options in the dropdown menus and the filled-in boxes, and thus the processing module 10 accordingly generates the topic, the at least one variable, and the selected writing type according to the setting command received from the input module 50. As a result, the processing module 10 of the present invention executes step S20 and step S30 in succession.

By selecting the verify button 132, the present invention executes step S20 without executing step S30, allowing the user to first visually understand the likely-successfulness of the project through the relevance graph before the user decides to proceed with further generating the content text for the project. By selecting the clear all button 133, the user is able to clear all of the filled-in boxes and all of the selections made through the dropdown menus on the first selection page 100, allowing the user to fill in new information and re-select available options on the first selection page 100 through utilizing the input module 50.

The selected writing type is a set of writing conditions imposed to the NLP model when communicating with the NLP model to generate the content text. The set of writing conditions include a content type for the content text, a word count for the content text, a language used for the content text, a tone used for the content text, and a writing perspective used for the content text. The content type for the content text, the word count for the content text, the language used for the content text, the tone used for the content text, and the writing perspective used for the content text are listed on the dropdown menus that are displayed to the user on the first selection page 100 through the display module 40.

In this embodiment, the content type for the content text is selected as an on-page blog article or an off-page guest article through a selection of the content type dropdown menu 121. Herein "on-page" means that the content text generated by the present invention is intended to be used on the web page administered by the user. The said "off-page" means that the content text generated is intended to be used elsewhere for a guest of another website rather than the web page administered by the user.

The word count for the content text is selected as 200 words, 300 words, 500 words, 600 words, 700 words, 1000 words, 1200 words, 1500 words, 1700 words, 2000 words, 2500 words, 3000 words, 3500 words, 4000 words, or 5000 words through a selection of the word count dropdown menu 122. The selected word count for the content text limits the amount of words contained in the generated content text.

The language used for the content text is selected as US English, UK English, or Australian English through a selection of the language dropdown menu 123.

The tone used for the content text is selected as a professional tone, an informative tone, an engaging tone, or a witty tone through a selection of the tone dropdown menu 124.

The writing perspective used for the content text is selected as writing from a first person's point of view, a second person's point of view, or a third person's point of view through a selection of the perspective dropdown menu 125. In the perspective dropdown menu 125, the first person's point of view is abbreviated as first, the second person's point of view is abbreviated as second, and the third person's point of view is abbreviated as third.

The first selection page 100 allows the user to select whether to communicate with the NLP model to generate the content text with a fixed amount of sections or with an automatically figured amount of sections through a selection of the sub-topic dropdown menu 126.

The first selection page 100 also allows the user to select a research type for the content text through a selection of the research type dropdown menu 127. The research type may be selected as a regular writing type, a marketing copyright writing type, a marketing copyright writing type showing sources, a marketing copyright writing type with fewer statistics, a marketing copyright writing type of a first deep learning type, a marketing copyright writing type of a second deep learning type, a marketing copyright writing type of a third deep learning type, and a marketing copyright writing type of a fourth deep learning type.

When the regular writing type is selected on the first selection page 100, the present invention communicates with the NLP model to generate the content text without additional requirements. When the marketing copyright writing type is selected, the present invention communicates with the NLP model to produce the content text with emphasis on technical detail such as date and ownership. When the marketing copyright writing type showing sources or with fewer statistics is selected, the present invention communicates with the NLP model for receiving the content text with, respectively, sources shown or fewer statistics shown. When the marketing copyright writing type of one of the deep learning types is selected, the present invention communicates with the NLP model for receiving the content text according to different versions of deep learning AI algorithms. For example, in practice, when the first deep learning type is selected, the present invention communicates with the NLP model to filter out unrelated information, such as unrelated meta tags, from the content text. When the second deep learning type is selected, the present invention communicates with the NLP model to explicitly include facts and figures in the content text. The FIGS. included in the content text are free to be any kinds of existing figure formats. When the third deep learning type is selected, the present invention communicates with the NLP model to spread out bullet points from main points of the overall generated article, and generate new sections and paragraphs dedicated for the bullet pointed sub-topics for lengthening the overall generated article with greater depth of generated content. When the fourth deep learning type is selected, the present invention communicates with GPT-4 as the NLP model for receiving the content text.

Working in conjuncture with the said three deep learning types, the present invention incorporates a search engine optimization (SEO) device, such as one described in U.S. patent application Ser. No. 17/580,863, for additionally researching relevancy of the variables, and as a result, enhancing the said specific results of generating the content text for the three deep learning types.

In addition, a customer profile or a project profile may be created through the input module 50 for storing customer information or project information in the memory module 20. If the customer profile or the project profile of the user already exists in the memory module 20, the customer profile or the project profile may be selected through the project selection dropdown menu 128 on the first selection page 100 for quickly loading the personalized settings, such as loading the at least one variable previously used by the user for producing the content text.

In this embodiment, each of the sections generated by the present invention contains one distinct sub-topic, and each of the sub-topics contains at least one paragraph. In other words, when the relevance data produced by the NLP model in accordance with the scanned components of the selected layout is received, the present invention further includes a step of communicating with the NLP model for receiving an amount of sub-topics equivalent to an amount of the at least one section of the web generated produced by the NLP model according to the selected writing type.

Figure 5C:
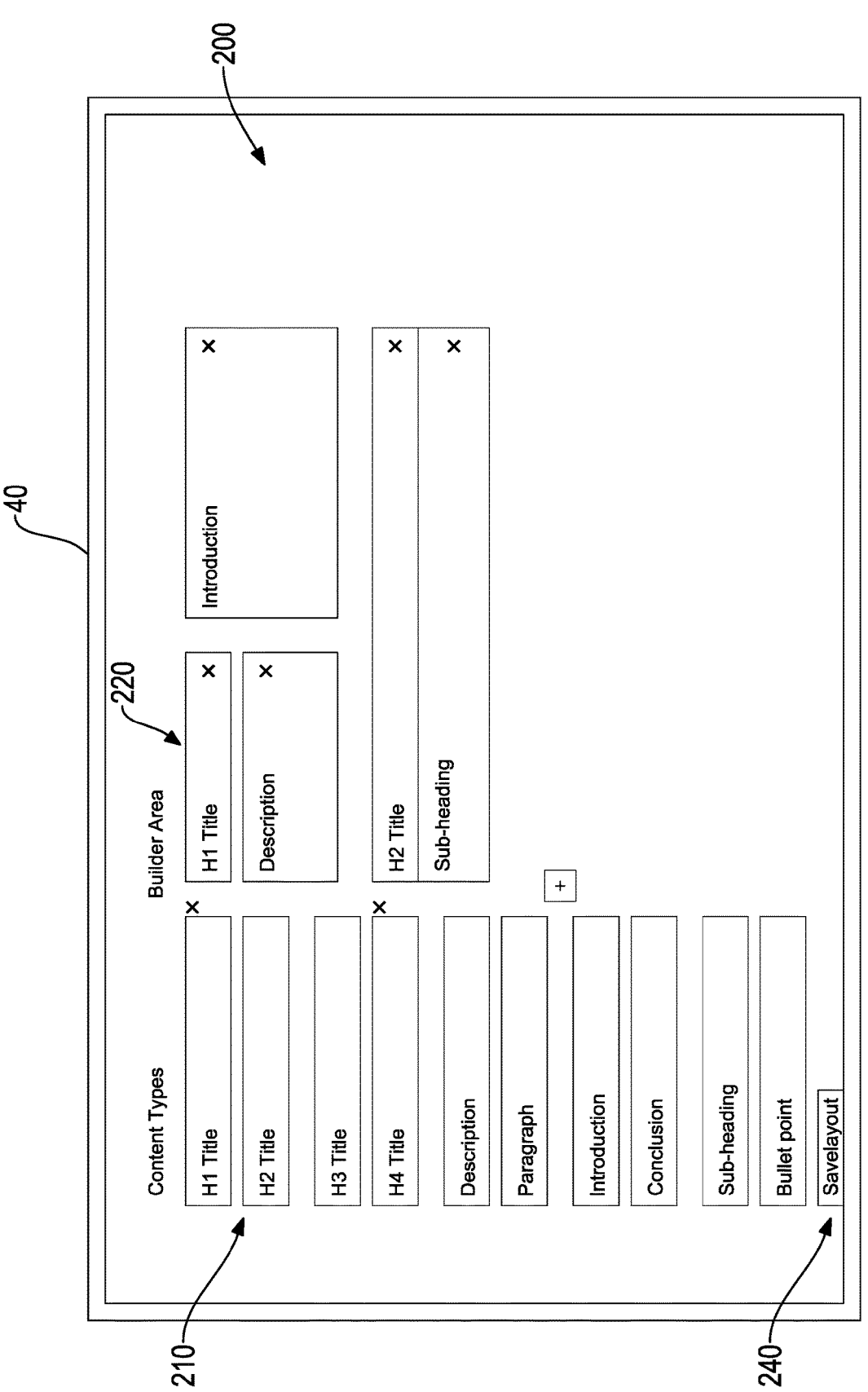
Figure 5D:
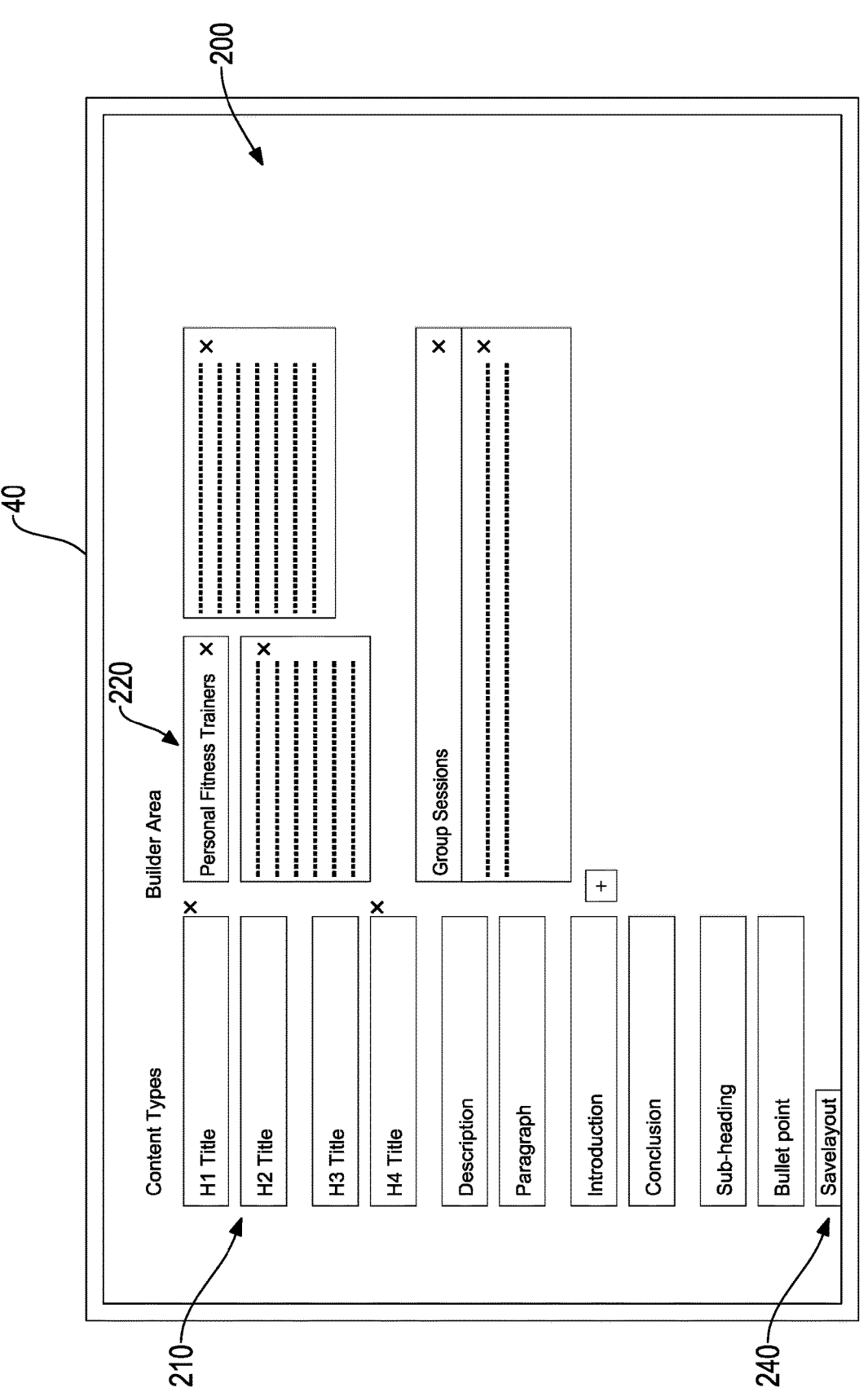

With reference to FIGS. 5B to 5D, several examples of the second selection page 200 display the layouts available for selection for the selected layout. The present invention further includes a step of enabling a drag and drop function according to the layouts displayed on one of the selection pages, and, allowing the user to modularly combine the layouts into a drafted article page.

For example, in FIG. 5B, the second selection page 200 displays multiple content types 210, a builder area 220, and layout modifier buttons 230. The content types 210 include common web page components such as a space for H1 Title (or header 1 title), a space for H2 Title (or header 2 title), multiple spaces for multiple sub-topics, a space for bullet-points, a space for introduction, and a space for conclusion, etc. The builder area 220 includes multiple sections of modifiable spaces of the webpage. These sections of modifiable spaces can be modified to have, for example, a single column, two columns, or three columns in a row. The user may select one of the layout modifier buttons 230 displayed on the display module 40 through the input module 50, allowing the sections of modifiable spaces to be modified. In this embodiment, by selecting the leftmost button of the layout modifier buttons 230, a single column is set in a row of modifiable space in the builder area 220, and by selecting the rightmost button of the layout modifier buttons 230, four columns are set in a row of modifiable space in the builder area 220.

With further reference to FIG. 5C, through controlling the input module 50, the user may select the content types 210 to be added in or removed from the builder area 220. As such, the content types 210 can be easily dragged and dropped to the sections of modifiable spaces in the builder area 220, allowing the user to conveniently and modularly modify the builder area 220 as the drafted article page. Furthermore, by pressing a save layout button 240 displayed on the second selection page 200, a current state of the builder area 220 is saved, and thus the drafted article page is saved as the selected layout used for generating the content text.

With further reference to FIG. 5D, once the selected layout is set, the scanned components of the selected layout list out all available spaces in the selected layout ready to be filled with generated contents. The present invention then proceeds to fill in the spaces with suitable content texts generated from executing the aforementioned steps of the present invention. Once the content texts are generated and filled in the spaces in the builder area 220, the user can still drag and drop to move around or delete the sections of modifiable spaces with content texts displayed on the second selection page 200. The sections may be deleted by simply selecting the cross on top right corner of each of the sections. As such, the user is able to freely modify a layout of content texts on the web page with ease. In other words, the present invention further comprises steps of filling the content text received from the NLP model into sections of the selected layout, and allowing the section of the selected layout with the content text to be edited through the enabled drag and drop function or to be deleted.

Figure 6:
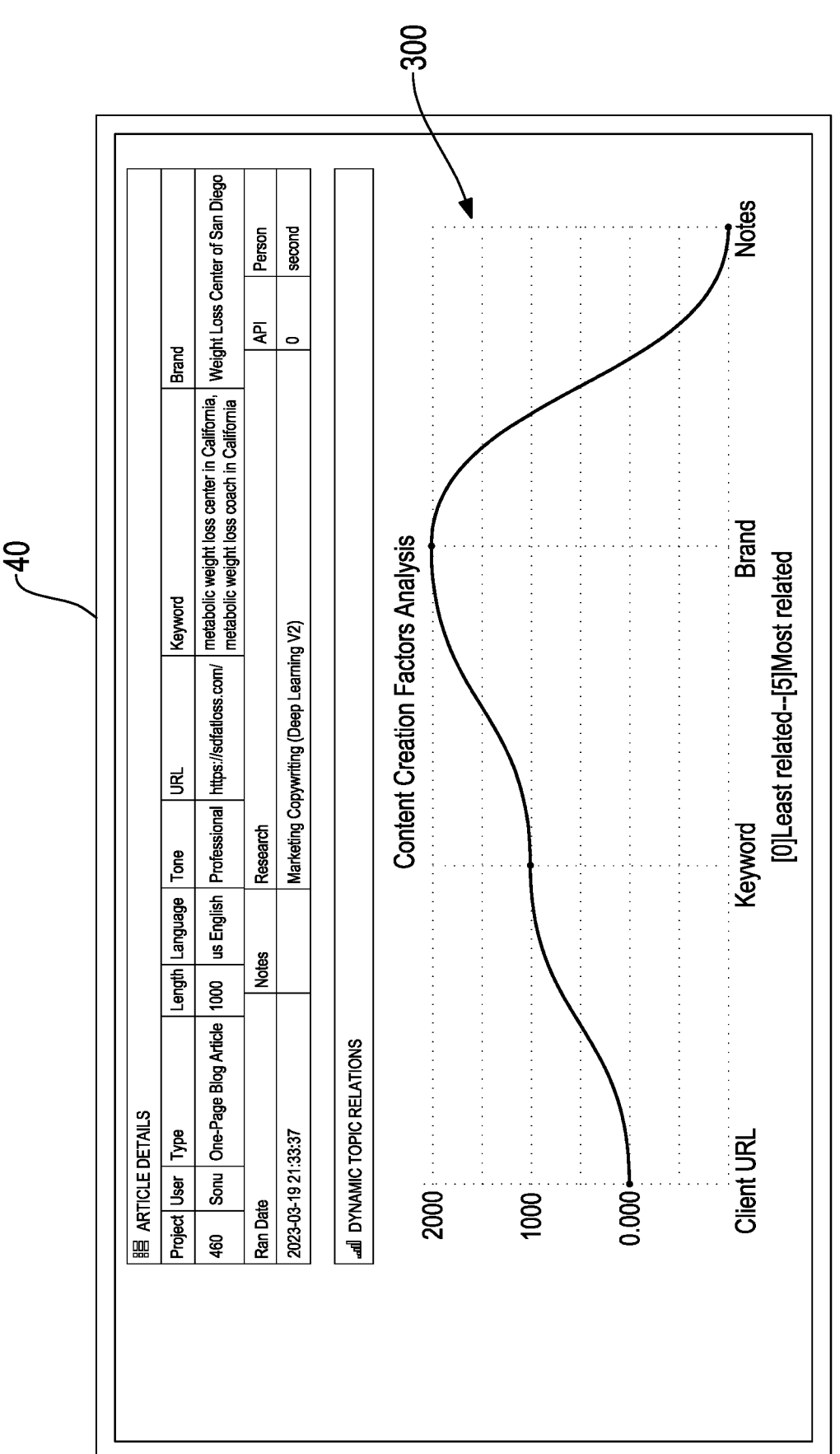
FIG. 6 is a perspective view of a relevance data shown on the display module in an embodiment of the computer-implemented dynamic content generation method of the present invention.

With reference to FIG. 6, in an example of the current embodiment, the relevance graph 300 is displayed on the display module 40. The variables being analyzed are the input URL reference, the keyword, the note, and the brand. Since the user omits providing the note, the present invention omits producing the relevance data between the note and the topic, and thus the note has a rating ignorable (smaller than zero). On the other hand, the relevance data of the topic to the input URL reference, the keyword, and the brand are visually displayed to the user through the display module 40, allowing the user to instantly understand how relevant each variable is towards the topic. In this example, according to Table 1, the input URL reference and the keyword are rated as zero and one as being not related to the topic, and the brand is rated as two as being barely related to the topic.

Figure 7:
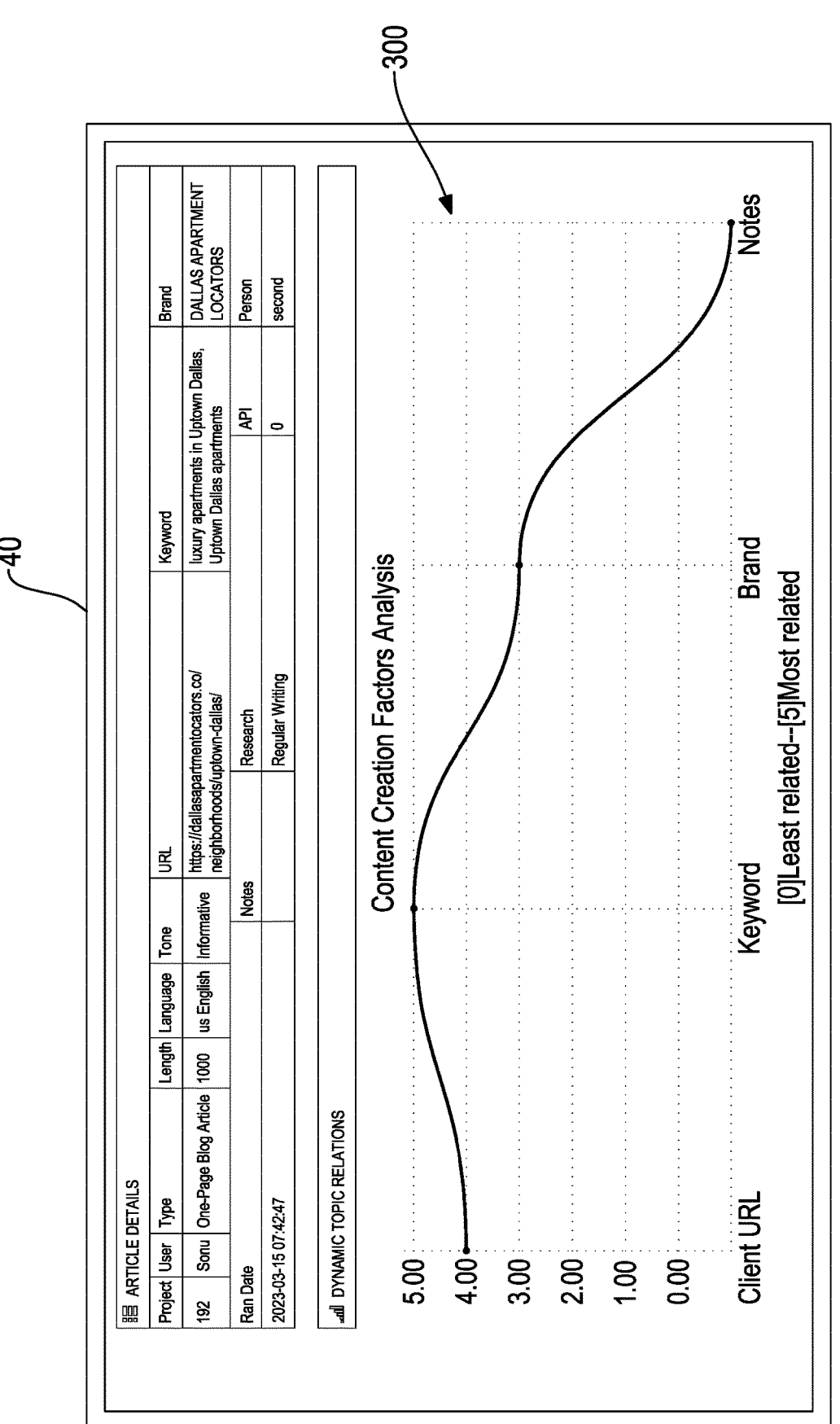
FIG. 7 is a perspective view of another relevance data shown on the display module in another embodiment of the computer-implemented dynamic content generation method of the present invention.

With reference to FIG. 7, in this example, according to Table 1 and the relevance graph 300 displayed by the display module 40, the input URL reference is rated as four as being related to the topic, the keyword is rated as five as being very related to the topic, the brand is rated as three as being somewhat related to the topic, and the notes are without being rated. By comparing the relevance graph 300 in various projects, such as comparing a project number 460 shown in the FIG. 6 example and another project, project number 192, shown in the FIG. 7 example, the user is able to visually understand how related the topic is to the at least one variable used for each project, and thus efficiently acknowledge a likely success of a project. A successful project likely entails a topic strongly related to various variables, and therefore the content text generated for the project will be more coherent, hence more successful as a generated article or a generated web page. The present invention allows the user to access the likely-successfulness of the project before the content texts are generated for the project.

Figure 8:
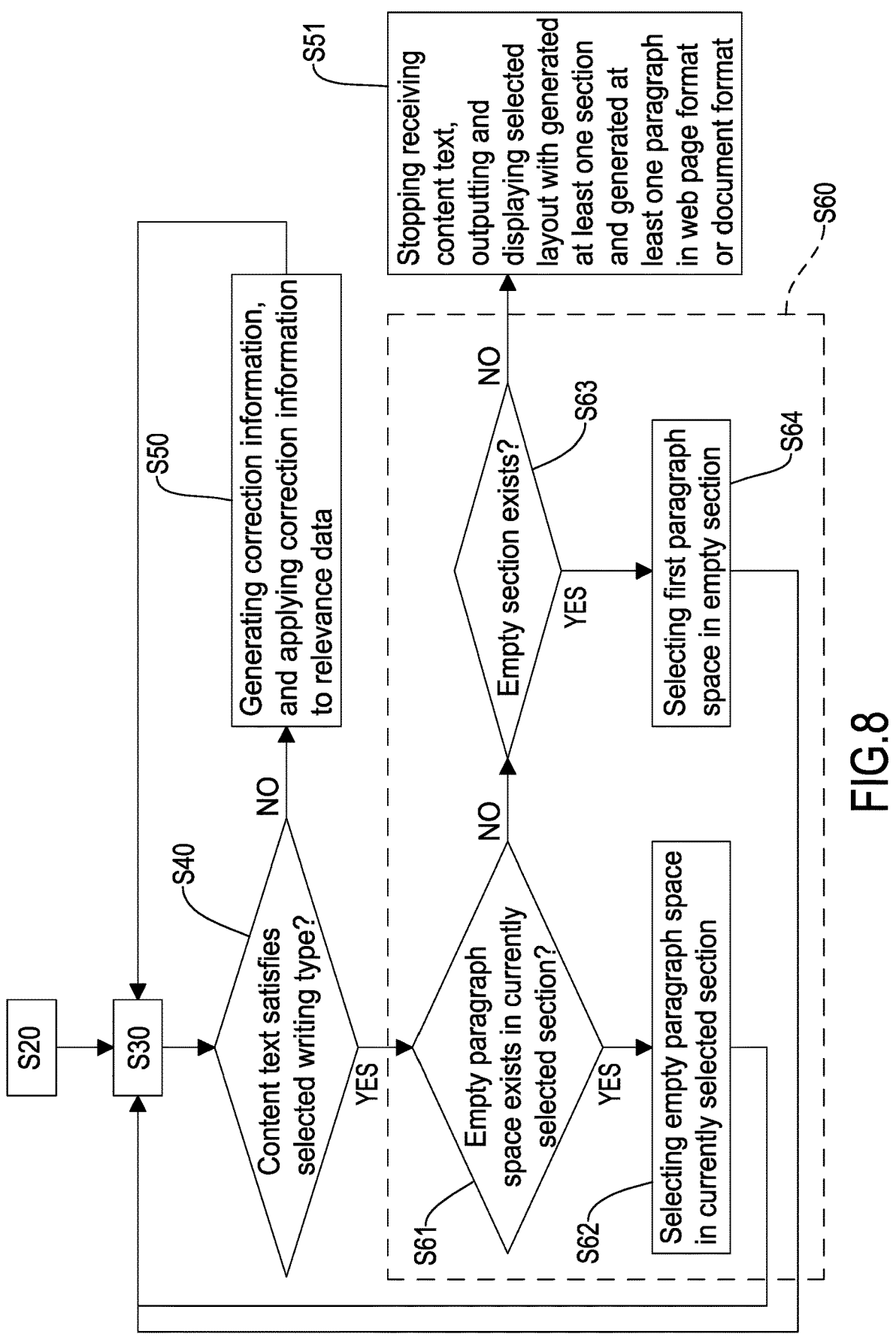
FIG. 8 is a flow chart of an embodiment of the computer-implemented dynamic content generation method of the present invention.

With reference to FIG. 8, in this embodiment, after executing step S40 and determining the content text satisfies the selected writing type, the present invention further includes the following step:

Step S60: when determining the content text satisfies the selected writing type, determining whether more paragraph spaces exist. When more paragraph spaces exist, communicating with the NLP model for receiving more content texts generated by the NLP model for filling in the empty paragraph spaces.

Furthermore, when determining all the empty paragraph spaces are filled in, besides stopping receiving content text, step S51 further includes sub-steps of outputting the web page and displaying the web page with the selected layout, the generated sections and the generated paragraphs. The outputted web page is in a web page format or a document format, and the outputted web page is stored in the memory module 20.

More particularly, step S60 further includes the following sub-steps:

Step S61: determining whether an empty paragraph space exists in a currently selected section;

Step S62: when the empty paragraph space exists in the currently selected section, selecting the empty paragraph space in the currently selected section, and executing step S30;

Step S63: when the empty paragraph space stops existing in the currently selected section, further determining whether an empty section exists; and Step S64: when the empty section exists, selecting a first paragraph space in the empty section, and executing step S30.

By executing the sub-steps S61 to S64, all empty paragraph spaces can be identified and subsequently filled with the generated content texts. As such, the present invention is able to fit the generated content texts into the empty paragraph spaces in each of the sections designated by the selected layout. The present invention automatically generates content, such as an internet article, in the selected layout format. As a result, the present invention provides the exact customized look the user has selected for the selected layout.

Figure 9A:
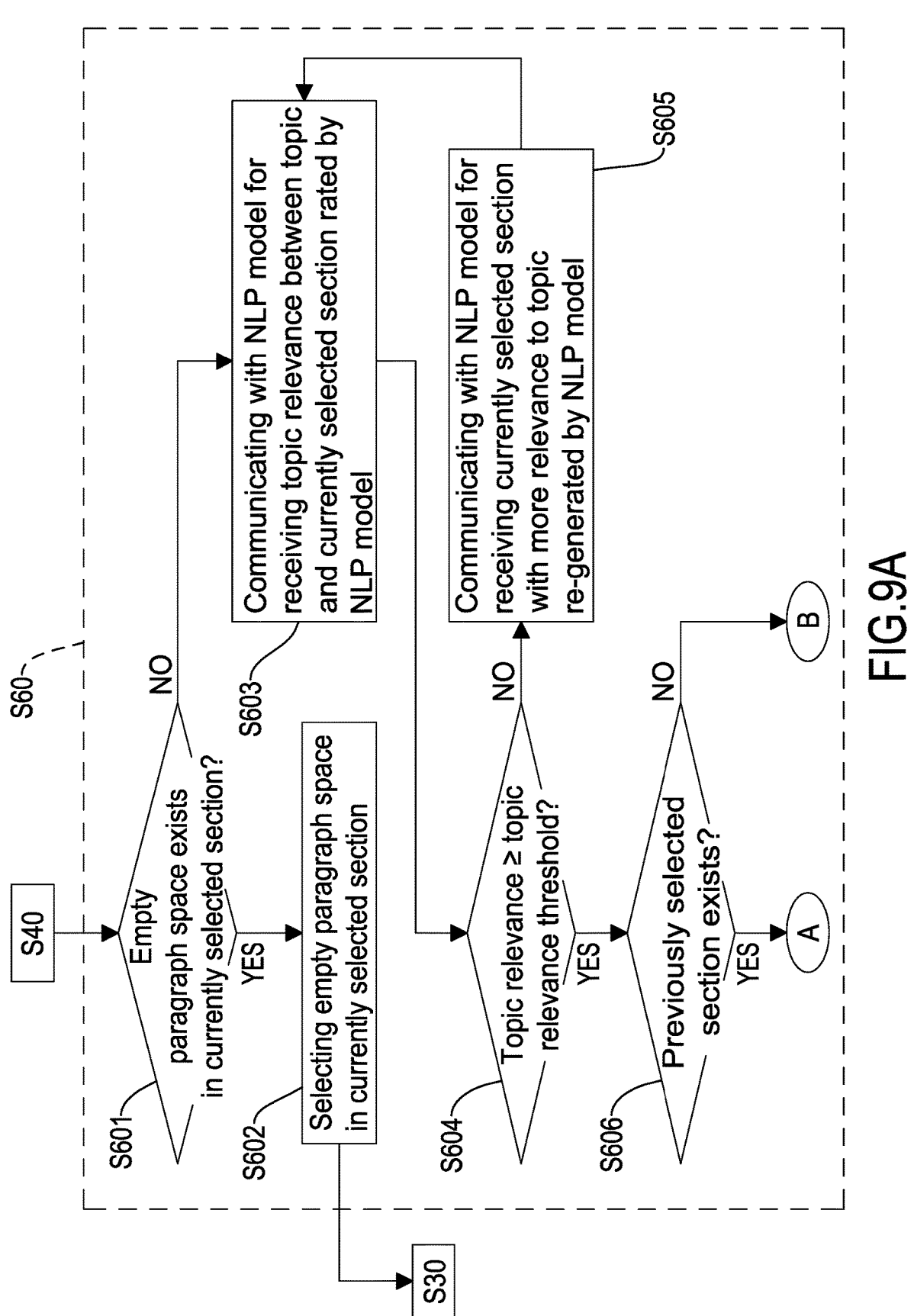
FIGS. 9A to 9C are flow charts of another embodiment of the computer-implemented dynamic content generation method of the present invention.
Figure 9B:
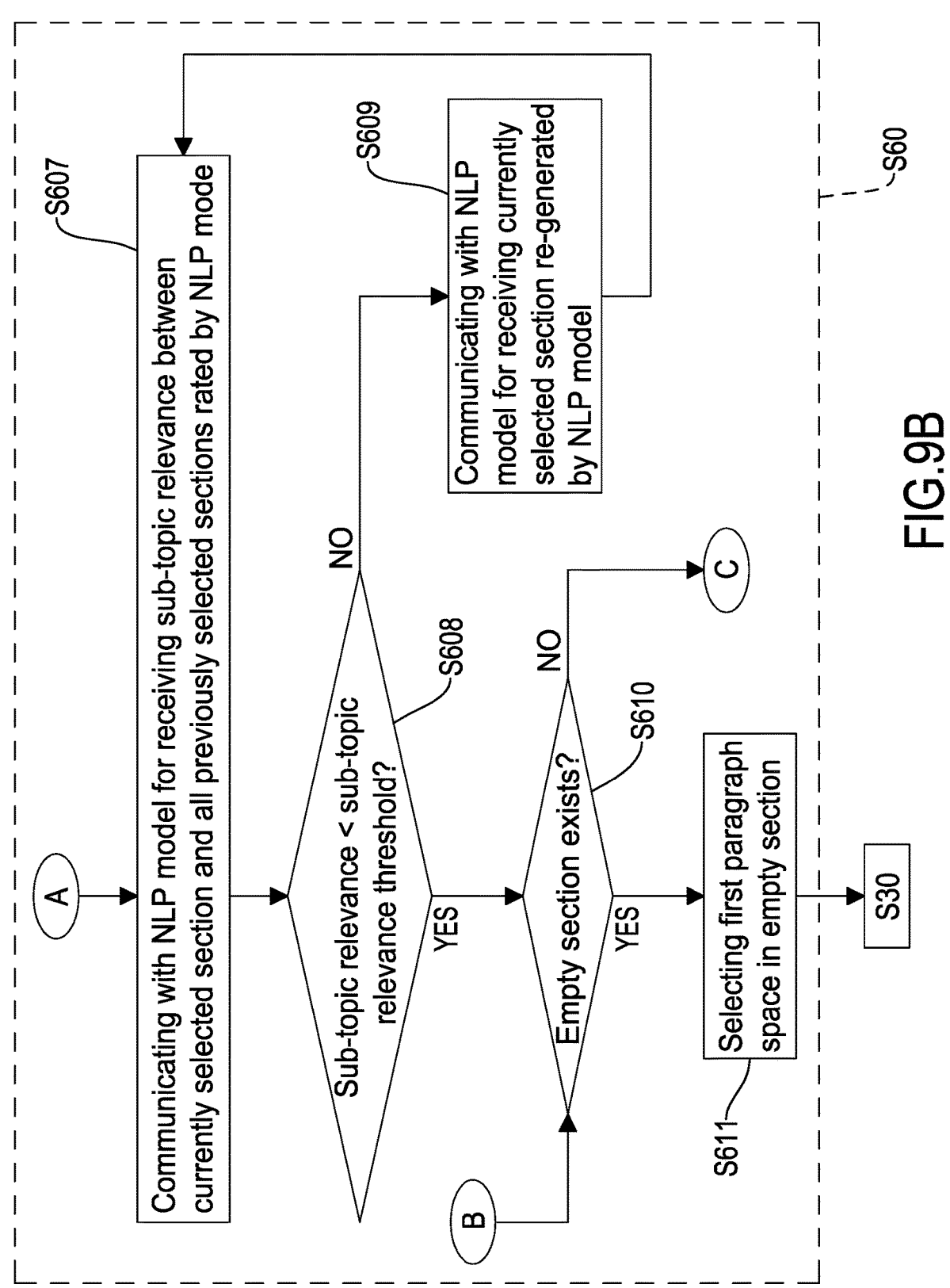
Figure 9C:
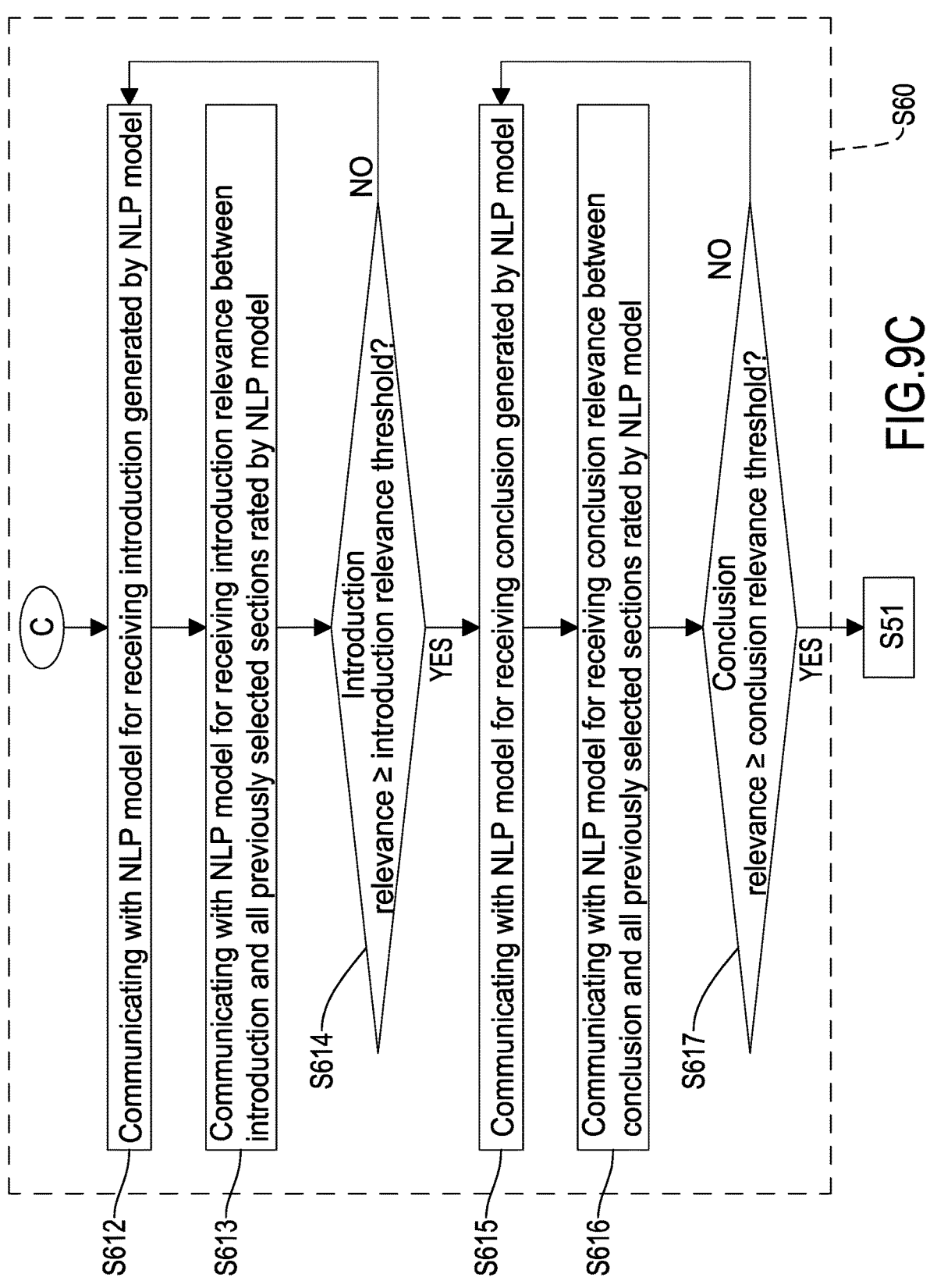

With reference to FIGS. 9A to 9C, in an example of another embodiment of the present invention, the selected layout is a web page with multiple sections, and the sections of the web page include a first sub-topic, a second sub-topic, a third sub-topic, an introduction, and a conclusion. Since the third sub-topic is followed by the conclusion of the web page, the third sub-topic in this case is also recognized as the last sub-topic. The present invention first generates the content texts for the first sub-topic, then iteratively generates the content texts for the next section, and only once all of the sub-topic sections are filled in, the present invention starts to generate the introduction and the conclusion sections of the web page. This specific order of generating an article mimics how humans can successfully write a coherent article with an introduction and a conclusion that refer back to all main points (all of the sub-topics) of the article. This feature, or rather this directory of how to generate each section of the selected layout in a coherent order, is able to distinguish the present invention from other content generation methods.

Furthermore, the memory module 20 stores various thresholds used for determining relevancy. The various thresholds include a topic relevance threshold, a sub-topic relevance threshold, an introduction relevance threshold, and a conclusion relevance threshold.

After step S40 determines that the content text satisfies the selected writing type, the present invention executes step S60. As the present invention first executes step S24, the first paragraph space of the first section is filled by the content text through step S30. Therefore, in this instance, the content text determined by step S40 refers to a first content text in the first section, or the first content text in the first sub-topic, of the web page. In this embodiment, the present invention executes step S60 having the following sub-steps:

Step S601: determining whether the empty paragraph space exists in the currently selected section;

Step S602: when the empty paragraph space exists in the currently selected section, selecting the empty paragraph space in the currently selected section, and executing step S30, i.e., selecting the second paragraph space in the first sub-topic, in order for the selected second paragraph space to be subsequently filled with the generated content text;

Step S603: when the empty paragraph space stops existing in the currently selected section, communicating with the NLP model for receiving a topic relevance between the topic and the currently selected section rated by the NLP model;

Step S604: determining whether the topic relevance is rated greater than or equal to the topic relevance threshold;

Step S605: when the topic relevance is rated less than the topic relevance threshold, communicating with the NLP model for receiving the currently selected section with more relevance to the topic re-generated by the NLP model, and executing step S603;

Step S606: when the topic relevance is rated greater than or equal to the topic relevance threshold, determining whether a previously selected section exists; when the previously selected section no longer exists, executing step S610;

Step S607: communicating with the NLP model for receiving the sub-topic relevance between the currently selected section and all previously selected sections rated by the NLP model;

Step S608: determining whether the sub-topic relevance is less than the sub-topic relevance threshold;

Step S609: when the sub-topic relevance is greater than or equal to the sub-topic relevance threshold, communicating with the NLP model for receiving the currently selected section re-generated by the NLP model;

Step S610: when the sub-topic relevance is less than the sub-topic relevance threshold, further determining whether the empty section exists; when the empty section no longer exists, executing step S612;

Step S611: when the empty section exists, selecting the first paragraph space in the empty section, and executing step S30;

Step S612: communicating with the NLP model for receiving the introduction generated by the NLP model;

Step S613: communicating with the NLP model for receiving an introduction relevance between the introduction and all previously selected sections rated by the NLP model;

Step S614: determining whether the introduction relevance is greater than or equal to the introduction relevance threshold; when the introduction relevance is less than the introduction relevance threshold, executing step S612;

Step S615: when the introduction relevance is greater than or equal to the introduction relevance threshold, further communicating with the NLP model for receiving the conclusion generated by NLP model;

Step S616: communicating with the NLP model for receiving a conclusion relevance between the conclusion and all previously selected sections rated by the NLP model; and Step S617: determining whether the conclusion relevance is greater than or equal to the conclusion relevance threshold; when the conclusion relevance is less than the conclusion relevance threshold, executing step S615; when the conclusion relevance is greater than or equal to the conclusion relevance threshold, executing step S51.

The concept is that each of the sub-topics on the web page should be unique and independent from each other, and thus formulating a clearer argument point for the generated content. The introduction and the conclusion should make logical connections throughout the generated content, hence having great relevance, to all of the sub-topics generated between the introduction and the conclusion, and thus formulating a clear overall argument point for the generated content. As such, the introduction and the conclusion of the web page would be able to tie themselves well to all of the distinct sub-topics of the web page, and thus formulating strong arguments.

Figure 10:
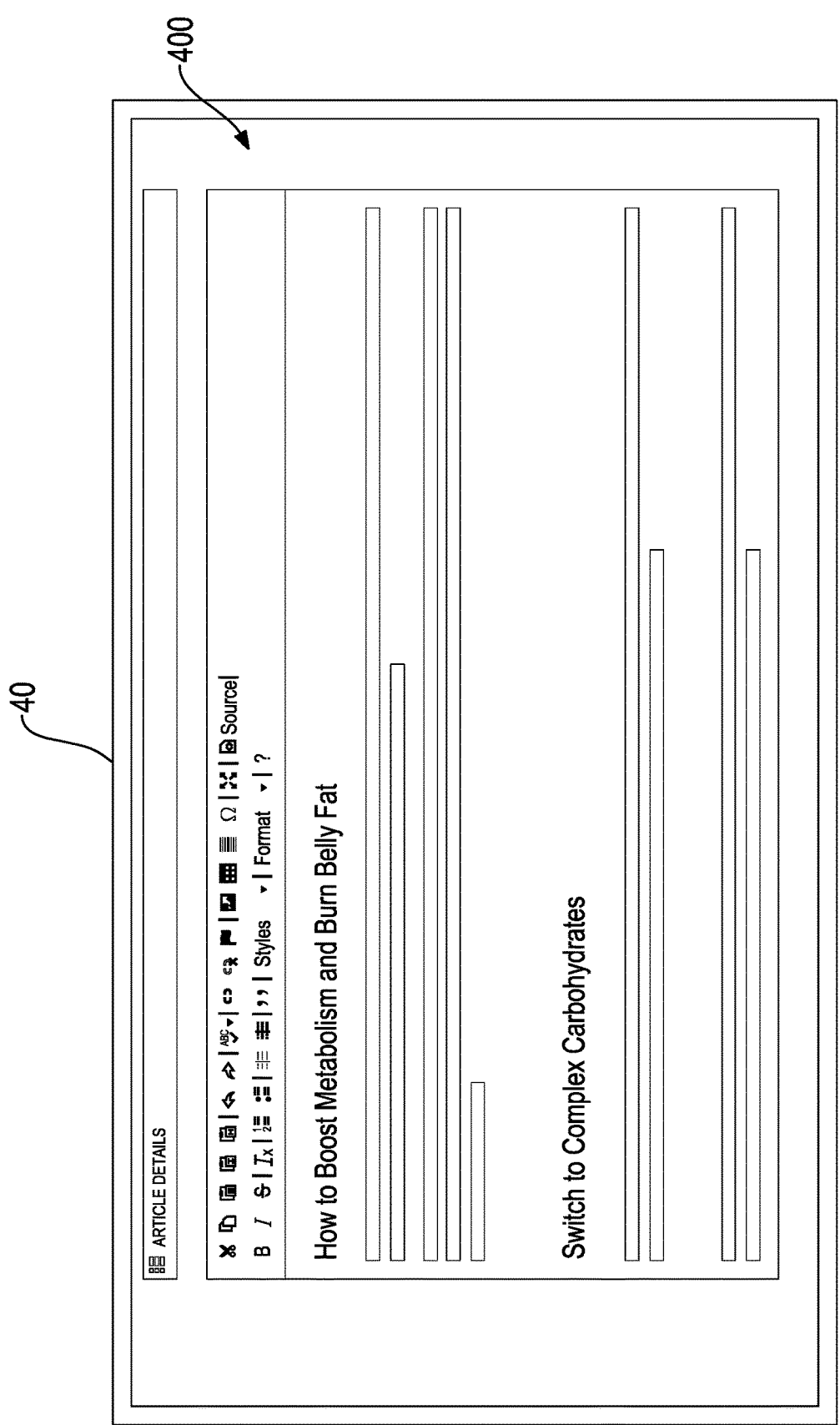
FIG. 10 is a perspective view of generated content texts shown on the display module in an embodiment of the computer-implemented dynamic content generation method of the present invention.

With reference to FIG. 10, after executing step S51, the display module 50 displays the generated web page in the selected layout and along with its generated sections (sub-topics) and its generated content texts. More particularly, in this embodiment, the display module 50 displays the generated article of the generated web page on an editable result page 400 displayed through the display module 40. The editable result page 400 provides the user means to edit the generated article with all of its generated content texts, so as to allow a freedom of user input and customization. By showing the user a word editing panel over the generated content texts, the user is able to choose editing options through using the input module 50 and allow the article to be more closely tailored to the user's need.

By using the present invention, the user is able to conveniently create a landing page, or more broadly speaking, any web page, internet article, or even just an article, with just inputting the topic and the at least one variable through the input module 50. By simply selecting the topic, the at least one variable, and the selected writing type, the user using the input module can generate content texts without needing to consecutively prompt and correct the NLP model for generating coherent and professionally written content texts. As such, the present invention saves time and tremendous effort a person needs to interact with the NLP model by skillfully, efficiently, and automatically communicating with the NLP model to satisfy the user's personalized need for content generation.

The present invention is able to generate the content as an article in the selected layout favored by the user, and ensure the article is coherent and natural as if written by a human being. The present invention makes use of the NLP model, such as GPT, but does more than an average user would be able to do by creating a higher level structure to ensure the NLP model can produce the content with a higher quality standard, and thus distinguishing itself with superior content generating effects than any prior arts and GPT itself.

Furthermore, in an embodiment, additional considerations are implemented in the present invention for building a higher-order model that incorporates relative determination when generating the content text. After the at least one variable is rated according to the relevance data in the present invention, the present invention adapts to provide different instructions to the NLP model for generating the content text according to the following:

TABLE 2

| Rating | Meaning | Optimization Action on Content Type | Recomm- endation on Content Type | Analyze URL? | Provide SEO Strategy? |
|---|---|---|---|---|---|
| 0, 1 | NOT RELATED | | | | |
| 2 | BARELY RELATED | | | | |
| 3 | SOMEWHAT RELATED | | Add to Recomm- endation List | Yes | Yes |
| 4 | RELATED | Add to Action List | | Yes | Yes |
| 5 | VERY RELATED | Add to Action List | | Yes | Yes |

In this embodiment, the present invention integrates the SEO device disclosed in U.S. patent application Ser. No. 17/580,863 and uses the SEO device to dynamically determine search engine optimization (SEO) of the at least one variable used for generating the content text. The present embodiment also uses Table 2 to determine different instructions to communicate to the NLP model. For example, when the at least one variable is an URL rated greater than or equal to the relevance threshold of three (as being somewhat related to the topic), the present invention determines a need to analyze the said URL for an SEO of the URL and SEO strategies for the said URL. After using the SEO device to obtain the SEO of the URL, the present embodiment proceeds to instruct the NLP model to generate optimized contents for the said URL. After using the SEO device to obtain the SEO strategies for the said URL, the present embodiment also proceeds to instruct the NLP model to generate optimized contents according to the SEO strategies. When the at least one variable is the URL rated less than the relevance threshold of three, the present invention determines a lack of need to analyze the said URL or to provide SEO strategies about the said URL.

Furthermore, the present invention also determines whether to optimize or recommend the content type for the content text generated by the NLP model according to Table 2. For instance, when the URL is rated equal to the relevance threshold of three, the present invention adds the content type for the content text to a recommendation list. When the URL is rated greater than or equal to the relevance threshold of four (as being related to the topic), the present invention adds the content type for the content text to an action list. When the URL is rated less than or equal to the relevance threshold of two (as being barely related to the topic), the present invention disregards the said URL.

The present invention uses the SEO device to list out the content types for the content text recommended to the NLP model according to the recommendation list for subsequently generating the content text in later iterations as part of the correction information. The present invention uses the SEO device to list out the content type for the content text optimized for the NLP model according to the action list for subsequently generating the content text in later iterations as part of the correction information, too. The content type of the content text is specified by a value of a content type array. For reference, the following lists out the content type array with values (V) representing all of its content types in this embodiment of the present invention:

TABLE 3

| Content type | V |
|---|---|
| Title | 0 |
| Exciting Title | 1 |
| Interesting Title | 2 |
| Trending Title | 3 |
| Clickbait Title | 4 |
| Viral Title | 5 |
| Product Title | 6 |
| Fearful Title | 7 |
| Page Title | 8 |
| Topic | 9 |
| Article Topic | 10 |
| Exciting Topic | 11 |
| Interesting Topic | 12 |
| Trending Topic | 13 |
| Clickbait Topic | 14 |
| Viral Topic | 15 |
| Fearful Topic | 16 |
| Description | 17 |
| Meta Description | 18 |
| Simple Description | 19 |
| Marketing Description | 20 |
| Exciting Description | 21 |
| Sales Description | 22 |
| Profile Description | 23 |
| Product Description | 24 |
| Question | 25 |
| FAQ | 26 |
| Idea | 27 |
| List | 28 |
| Idea List | 29 |
| Feature List | 30 |
| YouTube Video Title | 31 |
| YouTube Video Description | 32 |
| YouTube AdVideo Title | 33 |
| YouTube AdVideo Description | 34 |
| Google Ad Title | 35 |
| Google Ad Description | 36 |
| Amazon Title | 37 |
| Amazon Description | 38 |
| Facebook Ad Title | 39 |
| Facebook Ad Description | 40 |
| Facebook Post | 41 |
| Instagram Post | 42 |
| LinkedIn Post | 43 |
| Twitter Post | 44 |
| Google Post | 45 |
| Exciting Social Media Post | 46 |
| Interesting Social Media | 47 |

TABLE 3-continued

| Content type | V |
|---|---|
| Post Trending Social Media | 48 |
| Post Clickbait Social Media | 49 |
| Post Viral Social Media Post | 50 |
| Product Social Media Post | 51 |
| Fearful Social Media Post | 52 |
| Conversion-Optimized Title | 53 |
| Conversion-Optimized Description | 54 |
| Landing Page CTA Title | 55 |
| Landing Page CTA Description | 56 |
| H1 Title | 57 |
| H2 Title | 58 |
| H3 Title | 59 |
| H4 Title | 60 |
| H5 Title | 61 |
| Subtopic | 62 |
| Subheading | 63 |
| Exciting Subheading | 64 |
| Interesting Subheading | 65 |
| Trending Subheading | 66 |
| Article Subtopics | 67 |
| Landing Page CTA H1 Title | 68 |
| Landing Page CTA H2 Title | 69 |
| Landing Page CTA H3 Title | 70 |
| Product Overview | 71 |
| Bullet Points | 72 |
| Paragraph | 73 |
| Introduction | 74 |
| Conclusion | 75 |
| Video Comment | 76 |
| Blog Comment | 77 |
| Comment | 78 |
| CTA | 79 |
| Post Comment | 80 |
| Related Keyword | 81 |
| Relevant Keyword | 82 |
| Long-tail Keyword | 83 |
| Keyword Map | 84 |
| Keyword Ideas | 85 |
| SEO Strategy | 86 |
| SEO Rankings Plan | 87 |
| SEO Keyword Guide | 88 |
| SEO Content Plan | 89 |
| Similar Keyword | 90 |
| Contextual Keyword | 91 |
| Related Field | 92 |

TABLE 3-continued

| Content type | V |
|---|---|
| Related Industry | 93 |
| Related Profession | 94 |
| Related Technology | 95 |
| Related Use | 96 |
| Local Keyword | 97 |
| SEO Keyword | 98 |
| Article Keyword | 99 |
| Recommended Keyword | 100 |
| Peripheral Keyword | 101 |
| LSI Keyword | 102 |
| Synonym Keyword | 103 |
| Antonym Keyword | 104 |
| Buzzword | 105 |
| Infographic Title | 106 |
| Infographic Description | 107 |
| Webinar Title | 108 |
| Webinar Description | 109 |
| Podcast Title | 110 |
| Podcast Description | 111 |
| Ebook Title | 112 |
| Ebook Description | 113 |
| Whitepaper Title | 114 |
| Whitepaper Description | 115 |
| Case Study Title | 116 |
| Case Study Description | 117 |
| Resource Page Title | 118 |
| Resource Page Description | 119 |
| Testimonial | 120 |
| Quote | 121 |
| Statistic | 122 |
| Fact | 123 |
| Myth | 124 |
| Press Release Title | 125 |
| Press Release Description | 126 |
| News Article Title | 127 |
| News Article Description | 128 |
| Opinion Article Title | 129 |
| Opinion Article Description | 130 |
| Guest Post Title | 131 |
| Guest Post Description | 132 |
| How-to Guide Title | 133 |
| How-to Guide Description | 134 |
| Tutorial Title | 135 |
| Tutorial | 136 |

TABLE 3-continued

| Content type | V |
|---|---|
| Description | |
| Comparison Title | 137 |
| Comparison Description | 138 |
| Review Title | 139 |
| Review Description | 140 |
| Pro Tips | 141 |
| Best Practices | 142 |
| Step-by-Step Guide | 143 |
| Industry Insights | 144 |
| Expert Interview | 145 |
| Round-up Post Title | 146 |
| Round-up Post Description | 147 |
| User-generated Content Title | 148 |
| User-generated Content Description | 149 |
| Success Story Title | 150 |
| Success Story Description | 151 |
| Content Series Title | 152 |
| Content Series Description | 153 |
| Event Title | 154 |
| Event Description | 155 |
| Webinar Promotion | 156 |
| Podcast Promotion | 157 |
| Ebook Promotion | 158 |
| Whitepaper Promotion | 159 |
| Case Study Promotion | 160 |
| Survey Title | 161 |
| Survey Description | 162 |
| Research Title | 163 |
| Research Description | 164 |
| Slogan | 165 |
| Tagline | 166 |
| Mission Statement | 167 |
| Value Proposition | 168 |
| Unique Selling Proposition | 169 |
| Positioning Statement | 170 |
| Pillar Content Title | 171 |
| Pillar Content Description | 172 |
| Cluster Content Title | 173 |
| Cluster Content Description | 174 |
| Anchor Text | 175 |

TABLE 3-continued

| Content type | V |
|---|---|
| Alt Text | 176 |
| Image Caption | 177 |
| Featured Snippet | 178 |
| Rich Snippet | 179 |
| Meta Keywords | 180 |
| Hashtags | 181 |
| Influencer Collaboration Title | 182 |
| Influencer Collaboration Description | 183 |
| User Testimonial Title | 184 |
| User Testimonial Description | 185 |
| Email Subject Line | 186 |
| Email Preview Text | 187 |
| Email Header | 188 |
| Email Footer | 189 |
| Email Newsletter Title | 190 |
| Email Newsletter Description | 191 |
| Content Upgrade Title | 192 |
| Content Upgrade Description | 193 |
| Lead Magnet Title | 194 |
| Lead Magnet Description | 195 |
| Free Trial Offer | 196 |
| Limited Time Offer | 197 |
| Discount Offer | 198 |
| Referral Program Title | 199 |
| Referral Program Description | 200 |
| Affiliate Marketing Title | 201 |
| Affiliate Marketing Description | 202 |
| Sponsored Post Title | 203 |
| Sponsored Post Description | 204 |
| User Guide Title | 205 |
| User Guide Description | 206 |
| Gated Content Title | 207 |
| Gated Content Description | 208 |
| Voice Search Optimization | 209 |
| Schema Markup | 210 |
| Internal Linking Strategy | 211 |

The following provides an example prompt showing how the present invention communicates with the NLP model to generate the content text with instructions. The present invention prompts the NLP model with the topic of "analyze the SEO for https://seovendor.co/tag/critical-seo-factors/" for the keyword "Critical SEO Factors". The present invention also provides the NLP model with dynamically generated instructions according to how relevant the at least one variable is to the topic. The dynamically generated instructions are, for example, the aforementioned adding the content type of the content text to the action list or the recommend action list, to analyze the SEO of the URL, and to provide the SEO strategies for the URL. In other words, in this example, the dynamically generated instructions include using the SEO device to analyze the URL https://seovendor.co, to optimize the title of the content text, to optimize the meta description of the content text, and to provide the SEO strategy of content-focusing for the NLP model.

As a result, an example output of the content text looks like the following paragraphs:

To improve your website's SEO performance for the keyword "Critical SEO Factors" and rank better in search engine results, here is a plan with several key steps you can take:

1. Remove "noindex" Meta Tag: Ensure that the "noindex" directive is removed from the meta robots tag on the webpage you want to rank. The "noindex" directive prevents search engines from indexing the page, so removing it will allow the page to be indexed and appear in search results.

2. Optimize On-Page SEO Elements:
   Title Tag: Create a compelling and relevant title tag that includes the target keyword "Critical SEO Factors."
   Meta Description: Write an informative meta description that accurately describes the content of the page and includes the target keyword.
   Header Tags: Use header tags (H1, H2, H3, etc.) to structure your content, and include the target keyword in the main heading (H1) and subheadings where appropriate.

Here are optimized on-page SEO elements for the webpage "https://seovendor.co/tag/critical-seo-factors/" targeting the keyword "Critical SEO Factors":

1. Title Tag:
   "Top Critical SEO Factors for 2023: Boost Your Website Ranking—SEO Vendor"

2. Meta Description:
   "Discover the top critical SEO factors that can significantly improve your website's ranking in 2023. Learn actionable strategies and best practices from SEO experts at SEO Vendor."

3. Header Tags:
   H1: "Critical SEO Factors: Your Ultimate Guide to Ranking Higher in 2023"
   H2: "Understanding the Importance of Critical SEO Factors"
   H2: "On-Page SEO Factors: Optimizing Your Website for Success"
   H2: "Off-Page SEO Factors: Building Authority and Trust"
   H2: "Technical SEO Factors: Ensuring a Seamless User Experience"

The aforementioned example output demonstrates that, in an embodiment of the present invention, the computer-implemented dynamic content generation method is able to generate optimized SEO content for the user, allowing the generated content text to potentially gain more recognition online.

What is claimed is:

1. A computer-implemented dynamic content generation method, executed by a processing module that is in electrical connection with an input module, a memory module, and a communications module, and the communications module in electrical communication with a natural language processing (NLP) model; wherein the processing module performs content generation by: generating a topic, at least one variable, a selected layout, and a selected writing type according to a setting command received from the input module, scanning components of the selected layout, communicating with the NLP model through the communications module for receiving relevance data of the at least one variable to the topic generated by the NLP model in accordance with the scanned components of the selected layout, communicating with the NLP model through the communications module for receiving a content text generated by the NLP model according to the topic, the at least one variable, the selected writing type, and the relevance data, determining whether the content text satisfies the selected writing type, and stopping receiving the content text when the content text satisfies the selected writing type.

2. The computer-implemented dynamic content generation method as claimed in claim 1, wherein the NLP model is a Generative Pre-Trained Transformer (GPT).

3. The computer-implemented dynamic content generation method as claimed in claim 1, wherein after receiving the relevance data, the processing module executes:
   rating the at least one variable in terms of how related the at least one variable is to the topic according to the relevance data, and generating a relevance graph according to the relevance data of the at least one variable to the topic;
   wherein when the content text fails to satisfy the selected writing type, the processing module further generates a correction information, applies the correction information to the relevance data, communicates with the NLP model through the communications module for receiving the content text generated by the NLP model according to the topic, the at least one variable, the selected writing type, and the relevance data, and determines whether the content text satisfies the selected writing type.

4. The computer-implemented dynamic content generation method as claimed in claim 3, wherein the processing module is further electrically connected to a display module;
   wherein before generating the topic, the at least one variable, the selected writing type, and the selected layout according to the setting command received from the input module, the processing module executes:
   automatically displaying multiple writing conditions and multiple layouts on selection pages through the display module; and
   enabling a drag and drop function according to the layouts displayed on one of the selection pages, and allowing a user to modularly combine the layouts into a drafted article page;
   wherein the drafted article page is saved to be the selected layout.

5. The computer-implemented dynamic content generation method as claimed in claim 4, wherein the processing module further performs content generation by:
   after receiving the content text from the NLP model, filling the content text into a section of the selected layout;

allowing the section of the selected layout with the content text to be edited through the enabled drag and drop function or to be deleted.

6. The computer-implemented dynamic content generation method as claimed in claim 3, wherein the selected layout is a web page, and the scanned components of the selected layout comprise at least one paragraph space in at least one section of the web page;

wherein after receiving the relevance data, the processing module executes:

selecting a first paragraph space of a first section amongst the at least one paragraph space in the at least one section of the web page.

7. The computer-implemented dynamic content generation method as claimed in claim 6, wherein the processing module further performs content generation by:

when the relevance data generated by the NLP model in accordance with the scanned components of the selected layout is received, communicating with the NLP model for receiving an amount of sub-topics equivalent to an amount of the at least one section of the web page generated by the NLP model according to the selected writing type.

8. The computer-implemented dynamic content generation method as claimed in claim 6, wherein the web page for the selected layout is a landing page for a website.

9. The computer-implemented dynamic content generation method as claimed in claim 6, wherein before stopping receiving the content text, the processing module further performs content generation by:

determining whether an empty paragraph space exists in a currently selected section;

when the empty paragraph space exists in the currently selected section, selecting the empty paragraph space in the currently selected section, and communicating with the NLP model through the communications module for receiving the content text generated by the NLP model according to the topic, the at least one variable, the selected writing type, and the relevance data, and determining whether the content text satisfies the selected writing type;

when the empty paragraph space stops existing in the currently selected section, determining whether an empty section exists; and when the empty section exists, selecting a first paragraph space in the empty section, and communicating with the NLP model through the communications module for receiving the content text generated by the NLP model according to the topic, the at least one variable, the selected writing type, and the relevance data, and determining whether the content text satisfies the selected writing type.

10. The computer-implemented dynamic content generation method as claimed in claim 9, wherein the processing module is further electrically connected to a display module;

wherein when the empty section stops existing after the currently selected section, the processing module performs content generation by:

outputting and displaying the selected layout with the generated at least one section and the generated at least one paragraph in a web page format or a document format through the display module.

11. The computer-implemented dynamic content generation method as claimed in claim 6, wherein before stopping receiving the content text, the processing module further performs content generation by:

determining whether an empty paragraph space exists in a currently selected section;

when the empty paragraph space exists in the currently selected section, selecting the empty paragraph space in the currently selected section, and communicating with the NLP model through the communications module for receiving the content text generated by the NLP model according to the topic, the at least one variable, the selected writing type, and the relevance data, and determining whether the content text satisfies the selected writing type;

when the empty paragraph space stops existing in the currently selected section, communicating with the NLP model for receiving a topic relevance between the topic and the currently selected section rated by the NLP model;

determining whether the topic relevance is greater than a topic relevance threshold; and when the topic relevance is rated less than the topic relevance threshold, communicating with the NLP model for receiving the currently selected section with more relevance to the topic re-generated by the NLP model.

12. The computer-implemented dynamic content generation method as claimed in claim 6, wherein before stopping receiving the content text, the processing module further performs content generation by:

determining whether a previously selected section exists;

when the previously selected section exists, communicating with the NLP model for receiving a sub-topic relevance between a currently selected section and all previously selected sections rated by the NLP model;

determining whether the sub-topic relevance is rated less than a sub-topic relevance threshold;

when the sub-topic relevance is rated greater than the sub-topic relevance threshold, communicating with the NLP model for receiving the currently selected section re-generated by the NLP model.

13. The computer-implemented dynamic content generation method as claimed in claim 6, wherein before stopping receiving the content text, the processing module further performs content generation by:

determining whether an empty section exists;

when the empty section exists, selecting a first paragraph space in the empty section, and communicating with the NLP model through the communications module for receiving the content text generated by the NLP model according to the topic, the at least one variable, the selected writing type, and the relevance data, and determining whether the content text satisfies the selected writing type;

when the empty section stops existing, communicating with the NLP model for receiving an introduction generated by the NLP model;

communicating with the NLP model for receiving an introduction relevance between the introduction and all previously selected sections rated by the NLP model;

determining whether the introduction relevance is rated greater than an introduction relevance threshold; and when the introduction relevance is rated less than the introduction relevance threshold, executing communicating with the NLP model for receiving the introduction generated by the NLP model.

14. The computer-implemented dynamic content generation method as claimed in claim 6, wherein before stopping receiving the content text, the processing module further performs content generation by:

determining whether an empty section exists;

when the empty section exists, selecting a first paragraph space in the empty section, and communicating with the NLP model through the communications module for receiving the content text generated by the NLP model according to the topic, the at least one variable, the selected writing type, and the relevance data, and determining whether the content text satisfies the selected writing type;

when the empty section stops existing, communicating with the NLP model for receiving a conclusion generated by the NLP model;

communicating with the NLP model for receiving a conclusion relevance between the conclusion and all previously selected sections rated by the NLP model;

determining whether the conclusion relevance is rated greater than a conclusion relevance threshold; and when the conclusion relevance is rated less than the conclusion relevance threshold, executing communicating with the NLP model for receiving the conclusion generated by the NLP model.

15. The computer-implemented dynamic content generation method as claimed in claim 3, wherein the selected writing type is a set of writing conditions imposed to the NLP model when communicating with the NLP model to generate the content text;

wherein the set of writing conditions comprise a content type for the content text, a word count for the content text, a language used for the content text, a tone used for the content text, and a writing perspective used for the content text.

16. The computer-implemented dynamic content generation method as claimed in claim 3, wherein determining whether the content text satisfies the selected writing type further comprises:

determining whether the at least one variable is rated greater than a relevance threshold;

when the at least one variable is rated greater than the relevance threshold, accepting the at least one variable to be included in the content text according to the selected writing type, and determining that the content text satisfies the selected writing type; and when the at least one variable is rated less than the relevance threshold, rejecting the at least one variable from the content text according to the selected writing type, and generating and applying the correction information to filter out the rejected at least one variable from the relevance data, and determining that the content text fails to satisfy the selected writing type.

17. The computer-implemented dynamic content generation method as claimed in claim 3, wherein the content text comprises figures.

18. The computer-implemented dynamic content generation method as claimed in claim 1, wherein the at least one variable is an input Universal Resource Locator (URL) reference, a keyword, a note or instruction, a brand, a sub-topic, a recommended keyword, or a search engine optimization.

19. The computer-implemented dynamic content generation method as claimed in claim 1, wherein the NLP model is a large language model (LLM).

* * * * *